(12) United States Patent
Beaty et al.

(10) Patent No.: US 9,063,789 B2
(45) Date of Patent: Jun. 23, 2015

(54) HYBRID CLOUD INTEGRATOR PLUG-IN COMPONENTS

(75) Inventors: Kirk A. Beaty, Goldens Bridge, NY (US); Gerd Breiter, Wildberg (DE); David B. Lindquist, Raleigh, NC (US); Vijay K. Naik, Pleasantville, NY (US); Holger Reinhardt, Berlin (DE); Marc-Thomas H. Schmidt, Pound Ridge, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/023,103

(22) Filed: Feb. 8, 2011

(65) Prior Publication Data

US 2012/0203908 A1 Aug. 9, 2012

(51) Int. Cl.
*G06F 15/173* (2006.01)
*G06F 9/50* (2006.01)
*G06F 9/54* (2006.01)

(52) U.S. Cl.
CPC .............. *G06F 9/5072* (2013.01); *G06F 9/541* (2013.01)

(58) Field of Classification Search
CPC ...... G06F 9/541; G06F 15/173; G06F 9/5072
USPC ................................................. 709/217, 226
See application file for complete search history.

(56) References Cited

U.S. PATENT DOCUMENTS

| | | | |
|---|---|---|---|
| 6,421,737 B1 | 7/2002 | Stone et al. | |
| 6,473,794 B1 * | 10/2002 | Guheen et al. | 709/223 |
| 7,467,198 B2 | 12/2008 | Goodman et al. | |
| 7,644,161 B1 | 1/2010 | Graupner et al. | |
| 7,953,425 B2 | 5/2011 | Jordan | |
| 7,996,455 B2 * | 8/2011 | Jackson | 709/200 |
| 8,055,493 B2 | 11/2011 | Rolia et al. | |
| 8,370,482 B2 | 2/2013 | Shustef | |
| 8,745,361 B2 | 6/2014 | Shah et al. | |
| 8,988,998 B2 | 3/2015 | Adam et al. | |
| 9,009,697 B2 | 4/2015 | Breiter et al. | |
| 2003/0009547 A1 | 1/2003 | Benfield et al. | |
| 2004/0240408 A1 | 12/2004 | Gur | |

(Continued)

OTHER PUBLICATIONS

Adam et al., "Data Processing Enviroment Integration Control," U.S. Appl. No. 13/680,385, filed Nov. 19, 2012, 104 pages.

(Continued)

*Primary Examiner* — Vivek Srivastava
*Assistant Examiner* — Nicholas Celani
(74) *Attorney, Agent, or Firm* — Yee & Associates, P.C.; Louis J. Percello

(57) ABSTRACT

Integrating data processing resources across a hybrid cloud includes providing a plug-in software component configured to be installed in a software framework. When the plug-in software component is activated, it may generate an interface for a consumer of data processing resources. Using this interface, the consumer of data processing resources may request the use of data processing resources provided as a service on the hybrid cloud. In response, the plug-in software component may acquire the requested data processing resources via interfaces provided by the various data processing resources. A number of different data processing resources may have different interface requirements. However, the first interface generated by the plug-in software component may provide a single vendor neutral interface for accessing data processing resources on the hybrid cloud by the consumer of data processing resources.

25 Claims, 9 Drawing Sheets

(56) References Cited

U.S. PATENT DOCUMENTS

| | | | |
|---|---|---|---|
| 2005/0254421 A1 | 11/2005 | Galou et al. | |
| 2006/0215650 A1 | 9/2006 | Wollmershauser et al. | |
| 2007/0076312 A1* | 4/2007 | Jordan | 360/32 |
| 2007/0134069 A1 | 6/2007 | Smith et al. | |
| 2008/0022384 A1 | 1/2008 | Yee et al. | |
| 2008/0244579 A1 | 10/2008 | Muller | |
| 2009/0063869 A1 | 3/2009 | Kohavi et al. | |
| 2009/0113392 A1* | 4/2009 | Wijenayake et al. | 717/124 |
| 2009/0199193 A1* | 8/2009 | Jackson | 718/104 |
| 2009/0271472 A1* | 10/2009 | Scheifler et al. | 709/202 |
| 2009/0307705 A1 | 12/2009 | Bogner | |
| 2009/0328221 A1 | 12/2009 | Blumfield et al. | |
| 2010/0023949 A1* | 1/2010 | Jackson | 718/104 |
| 2010/0042670 A1 | 2/2010 | Kamalakantha et al. | |
| 2010/0042720 A1 | 2/2010 | Stienhans et al. | |
| 2010/0192170 A1 | 7/2010 | Raleigh | |
| 2010/0199267 A1 | 8/2010 | Rolia et al. | |
| 2010/0250746 A1 | 9/2010 | Murase | |
| 2010/0292857 A1 | 11/2010 | Bose et al. | |
| 2011/0004654 A1 | 1/2011 | Tasa et al. | |
| 2011/0016214 A1* | 1/2011 | Jackson | 709/226 |
| 2011/0126047 A1 | 5/2011 | Anderson et al. | |
| 2011/0131316 A1 | 6/2011 | Ferris et al. | |
| 2011/0131504 A1 | 6/2011 | Shustef | |
| 2011/0231899 A1 | 9/2011 | Pulier et al. | |
| 2011/0289329 A1 | 11/2011 | Bose et al. | |
| 2012/0023221 A1 | 1/2012 | Dayan | |
| 2012/0030341 A1 | 2/2012 | Jensen et al. | |
| 2012/0036249 A1 | 2/2012 | Chandrasekaran | |
| 2012/0054763 A1 | 3/2012 | Srinivasan | |
| 2012/0096320 A1 | 4/2012 | Caffrey | |
| 2012/0110044 A1 | 5/2012 | Nagpal et al. | |
| 2012/0159337 A1 | 6/2012 | Travilla et al. | |
| 2012/0166992 A1 | 6/2012 | Huynh et al. | |
| 2012/0204169 A1 | 8/2012 | Breiter et al. | |
| 2012/0204187 A1* | 8/2012 | Breiter et al. | 718/105 |
| 2012/0221690 A1 | 8/2012 | Beaty et al. | |
| 2012/0222084 A1 | 8/2012 | Beaty et al. | |
| 2012/0239722 A1 | 9/2012 | Bolosky et al. | |
| 2012/0272249 A1 | 10/2012 | Beaty et al. | |
| 2013/0185413 A1 | 7/2013 | Beaty et al. | |

OTHER PUBLICATIONS

Adam et al., "Data Processing Enviroment Integration Control Interface," U.S. Appl. No. 13/680,458, filed Nov. 19, 2012, 104 pages.

Beaty et al., "Data Processing Environment Event Correlation," U.S. Appl. No. 13/533,517, filed Jun. 26, 2012, 108 pages.

"Cloud Computing," National Institute of Standards and Technology, http://csrc.nist.gov/groups/SNS/cloud-computing/index.html, created May 11, 2009, accessed May 11, 2011, 1 page.

Mell et al., "The NIST Definition of Cloud Computing (Draft), Recommendations of the National Institute of Standards and Technology," Jan. 2011, 7 pages.

Breiter et al., "Hybrid Cloud Integrator" U.S. Appl. No. 13/023,051, filed Feb. 8, 2011, 67 pages.

Breiter et al., "Hybrid Cloud Workload Management," U.S. Appl. No. 13/023,159, filed Feb. 8, 2011, 86 pages.

Beaty et al., "Integrated Metering of Service Usage for Hybrid Clouds," U.S. Appl. No. 13/350,752, filed Jan. 14, 2012, 67 pages.

Beaty et al., "Virtual Security Zones for Data Processing Environments," U.S. Appl. No. 13/358,186, filed Jan. 25, 2012, 100 pages.

Beaty et al., "Data Processing Environment Monitoring," U.S. Appl. No. 13/400,505, filed Feb. 20, 2012, 100 pages.

Non-final office action dated Mar. 7, 2013 regarding U.S. Appl. No. 13/023,159, 27 pages.

Final office action dated Sep. 9, 2013 regarding U.S. Appl. No. 13/023,159, 27 pages.

Office action dated Mar. 21, 2014, regarding U.S. Appl. No. 13/400,505, 72 pages.

Office action dated Mar. 28, 2014, regarding U.S. Appl. No. 13/533,517, 60 pages.

Office action dated Aug. 14, 2014, regarding U.S. Appl. No. 13/358,186, 34 pages.

Office action dated Sep. 12, 2014, regarding U.S. Appl. No. 13/680,385, 43 pages.

Final office action dated Sep. 2, 2014, regarding U.S. Appl. No. 13/533,517, 43 pages.

Office action dated Jun. 19, 2014, regarding U.S. Appl. No. 13/023,051, 57 pages.

Notice of allowance dated Dec. 5, 2014, regarding U.S. Appl. No. 13/023,051, 19 pages.

Final office action dated Dec. 23, 2014, regarding U.S. Appl. No. 13/358,186, 20 pages.

Notice of allowance dated Nov. 7, 2014, regarding U.S. Appl. No. 13/680,385, 14 pages.

Office action dated Dec. 3, 2014, regarding U.S. Appl. No. 13/680,485, 52 pages.

Notice of Allowance, dated Nov. 25, 2013, regarding U.S. Appl. No. 13/023,159, 16 pages.

Notice of allowance dated Mar. 27, 2015, regarding U.S. Appl. No. 13/358,186, 14 pages.

Notice of allowance dated Feb. 2, 2015, regarding U.S. Appl. No. 13/680,485, 9 pages.

* cited by examiner

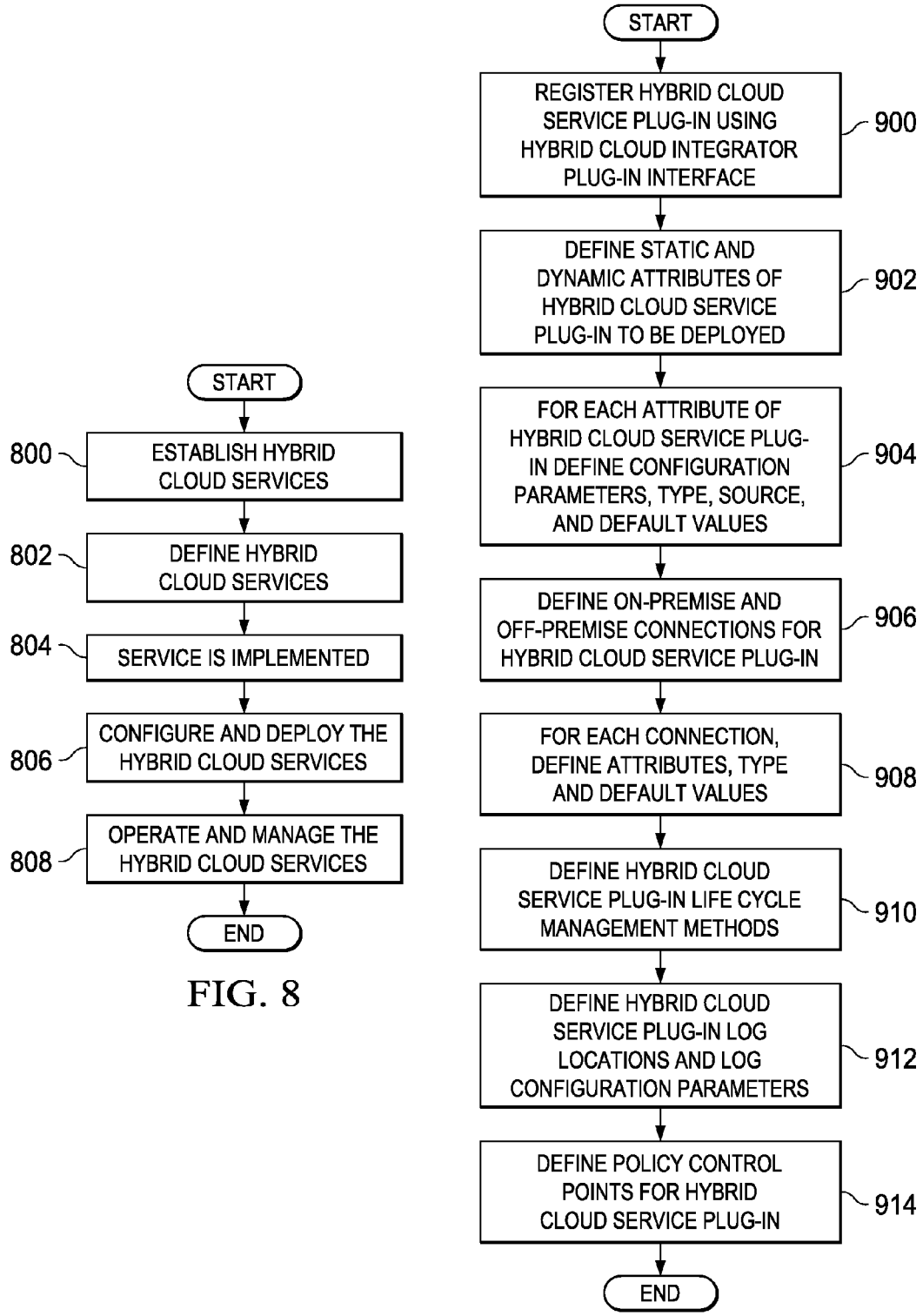

HYBRID CLOUD INTEGRATOR PLUG-IN COMPONENTS

BACKGROUND

1. Field

The disclosure relates generally to data processing systems and methods and more specifically to systems and methods for using data processing resources provided as a service, known as cloud computing.

2. Description of the Related Art

Cloud computing is a model of service delivery for enabling convenient, on-demand network access to a shared pool of configurable computing resources that can be rapidly provisioned and released with minimal management effort or interaction with a provider of the service. For example, cloud computing allows a consumer to obtain data processing resources, such as networks, network bandwidth, servers, processing, memory, storage, applications, virtual machines, and services as a service on a temporary basis when needed. Several vendors are currently offering various cloud services. For example, such services include infrastructure as a service, platform as a service, storage as a service, software as a service, and business process as a service cloud services. These services use vendor-specific service request, access, and consumption models.

A consumer of cloud computing services may have its own data processing system resources. For example, the consumer may be a business or other entity. The consumer may have invested in its own data processing system resources. These resources may include a computer network. The consumer's computer network provides a limited amount of processing capability and data storage resources. The consumer's computer network also provides specific data processing applications. The consumer's computer network may be located on-premise and may be operated as a private cloud.

At certain times, the consumer may require data processing resources beyond those available in its computer network. For example, at certain times, the demand for data processing resources may outstrip the capability of the consumer's computer network. At these times, the response time of the consumer's computer network for some applications may increase to unacceptable levels. At other times, the consumer may require data processing applications that are not available on the consumer's own computer network. For example, the consumer may require, at times, the use of data processing applications that are not part of the consumer's core competency.

At those times when the consumer requires data processing resources beyond its own, the consumer may purchase such resources as a service on a temporary basis from a provider of cloud computing services. For example, the consumer may obtain additional processing or storage resources or specific application functionality as a service on a temporary basis from the cloud computing provider's data processing resources. Different types of service offerings may provide parts of the solution used in processing the consumer's workload. The provider's available data processing resources is known as a public cloud.

The consumer typically continues to operate its own computer network while some data processing resources are being obtained from a public cloud. Thus, data processing resources from the public cloud typically are obtained in order to supplement the data processing resources of the consumer's own private cloud at certain times of need. The simultaneous and coordinated operation of data processing resources from multiple clouds may be referred to as hybrid cloud computing. For example, operation of the consumer's private cloud along with resources obtained from one or more public clouds is a specific example of hybrid cloud computing.

SUMMARY

According to one illustrative embodiment, a computer program product for integrating data processing resources is provided. The computer program product includes program instructions stored on a computer readable storage medium. The program instructions form a plug-in software component configured to be installed in a software framework. The program instructions include program instructions to provide a first interface for a consumer of data processing resources and program instructions to communicate with first data processing resources via data processing resource interfaces of the first data processing resources. The first data processing resources are provided as a service. The program instructions also include program instructions to use the first data processing resources for the consumer of data processing resources via the data processing resource interfaces, responsive to a communication from the consumer of data processing resources via the first interface.

According to another illustrative embodiment, a method for integrating data processing resources is provided. A first interface for a consumer of data processing resources is generated. A request from a consumer of data processing resources to acquire first data processing resources is received via the first interface. The first data processing resources are provided as a service. Responsive to receiving the request, the first data processing resources are acquired for the consumer of data processing resources via data processing resource interfaces of the first data processing resources.

According to yet another illustrative embodiment, an apparatus for integrating data processing resources is provided. The apparatus comprises a data processing system configured to install a plug-in software component in a software framework, to use the plug-in software component to generate a first interface for a consumer of data processing resources, to receive, via the first interface, a request from a consumer of data processing resources to use first data processing resources, and to use the plug-in software component to acquire the first data processing resources for use by the consumer of data processing resources via data processing resource interfaces of the first data processing resources, responsive to receiving the request from the consumer of data processing resources. The first data processing resources are provided as a service.

Other objects, features, and advantages of the illustrative embodiments will be apparent from the following detailed description taken in consideration with the attached drawing figures.

BRIEF DESCRIPTION OF THE SEVERAL VIEWS OF THE DRAWINGS

FIG. 8 is a flowchart of a high-level process workflow for establishing hybrid cloud services using a hybrid cloud integrator in accordance with an illustrative embodiment;

FIG. 9 is a flowchart of a process for configuring a hybrid cloud service plug-in using a hybrid cloud service plug-in interface in accordance with an illustrative embodiment.

DETAILED DESCRIPTION

Figure 1:
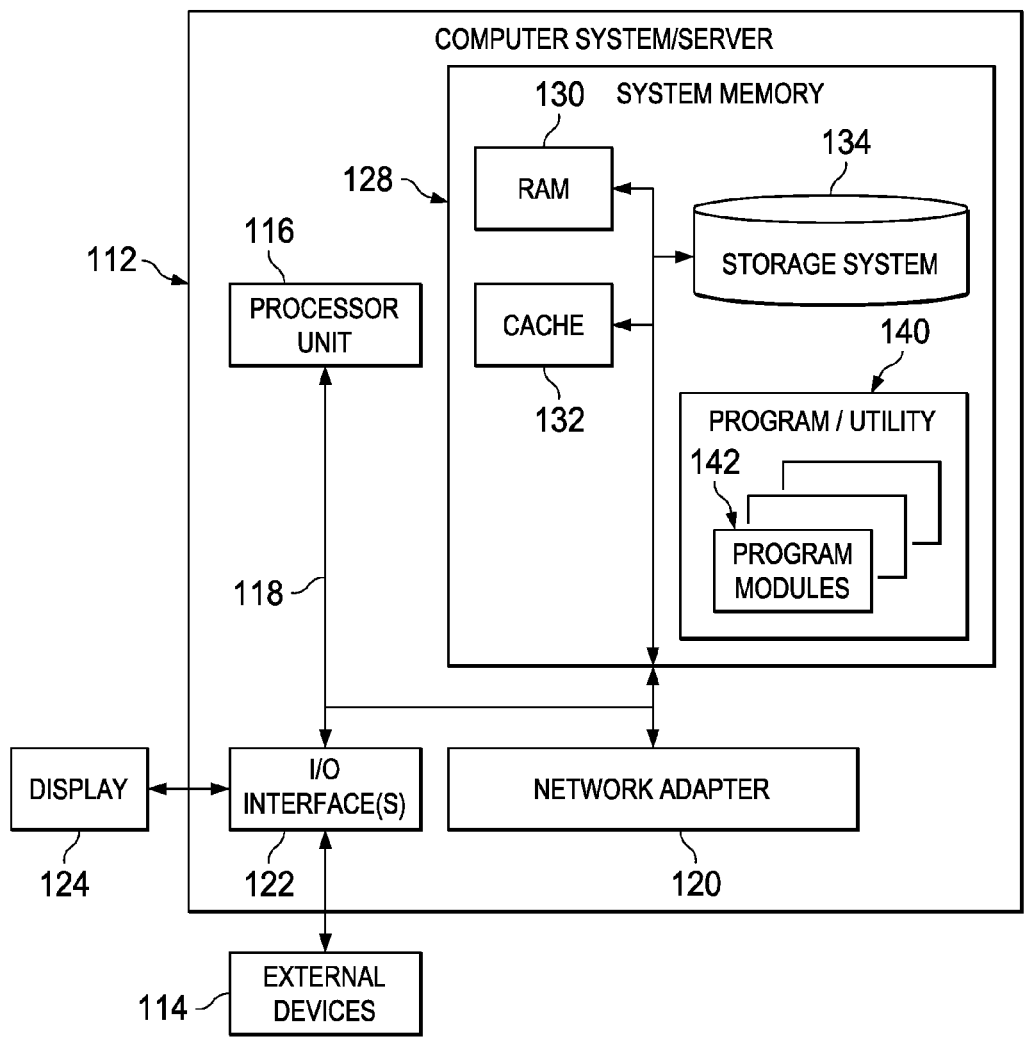
FIG. 1 is a schematic of an example of a cloud computing node in accordance with an illustrative embodiment.

It is understood in advance that although this disclosure includes a detailed description on cloud computing, implementation of the teachings recited herein are not limited to a cloud computing environment. Rather, the illustrative embodiments are capable of being implemented in conjunction with any other type of computing environment now known or later developed.

For convenience, the detailed description includes the following definitions which have been derived from the "Draft NIST Working Definition of Cloud Computing" by Peter Mell and Tim Grance, dated Oct. 7, 2009.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases, automatically to quickly scale out and rapidly release to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities with the possible exception of limited user-specific application configuration settings.

Platform as a Service (PaaS): the capability provided to the consumer is to deploy onto the cloud infrastructure consumer-created or consumer-acquired applications created using programming languages and tools supported by the provider. The consumer does not manage or control the underlying cloud infrastructure including networks, servers, operating systems, or storage but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds) and service interoperability.

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is depicted in accordance with an illustrative embodiment. Cloud computing node 110 is only one example of a suitable cloud computing node and is not intended to suggest any limitation as to the scope of use or functionality of the illustrative embodiments described herein. Regardless, cloud computing node 110 is capable of being implemented and/or performing any of the functionality set forth hereinabove.

In cloud computing node 110 there is computer system/server 112, which is operational with numerous other general purpose or special purpose computing system environments or configurations. Examples of well-known computing systems, environments, and/or configurations that may be suitable for use with computer system/server 112 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices and the like.

Computer system/server 112 may be described in the general context of computer system executable instructions, such as program modules being executed by a computer system. Generally, program modules may include routines, programs, objects, components, logic, data structures, and so on that perform particular tasks or implement particular abstract data types. Computer system/server 112 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 112 in cloud computing node 110 is shown in the form of a general purpose computing device. The components of computer system/server 112 may include, but are not limited to, one or more processors or processor unit 116, system memory 128, and bus 118 that couples various system components including system memory 128 to processor unit 116.

Processor unit 116 executes instructions for software that may be loaded into system memory 128. Processor unit 116 may be a number of processors, a multi-processor core, or some other type of processor, depending on the particular implementation. A number, as used herein with reference to an item, means one or more items. Further, processor unit 116 may be implemented using a number of heterogeneous processor systems in which a main processor is present with secondary processors on a single chip. As another illustrative example, processor unit 116 may be a symmetric multi-processor system containing multiple processors of the same type.

Bus 118 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 112 typically includes a variety of computer system readable media. Such media may be any available media that is accessible by computer system/server 112 and it includes both volatile media, non-volatile media, removable media, and non-removable media.

System memory 128 can include computer system readable media in the form of volatile memory, such as random access memory (RAM) 130 and/or cache memory 132. Computer system/server 112 may further include other removable/non-removable and volatile/non-volatile computer system storage media. By way of example only, storage system 134 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk") and an optical disk drive for reading from or writing to a removable, non-volatile optical disk such as a CD-ROM, DVD-ROM or other optical media can be provided. In such instances, each can be connected to bus 118 by one or more data media interfaces. As will be further depicted and described below, memory 128 may include at least one program product having a set (e.g., at least one) of program modules that are configured to carry out the functions of embodiments of the illustrative embodiments.

Program/utility 140, having a set (at least one) of program modules 142, may be stored in memory 128 by way of example and not limitation, as well as an operating system, one or more application programs, other program modules, and program data. Each of the operating systems, one or more application programs, other program modules, and program data or some combination thereof, may include an implementation of a networking environment. Program modules 142 generally carry out the functions and/or methodologies of the illustrative embodiments as described herein.

Computer system/server 112 may also communicate with one or more external devices 114, such as a keyboard, a pointing device, display 124, etc.; one or more devices that enable a user to interact with computer system/server 112; and/or any devices (e.g., network card, modem, etc.) that enable computer system/server 112 to communicate with one or more other computing devices. Such communication can occur via I/O interfaces 122. Still yet, computer system/server 112 can communicate with one or more networks, such as a local area network (LAN), a general wide area network (WAN), and/or a public network (e.g., the Internet) via network adapter 120. As depicted, network adapter 120 communicates with the other components of computer system/server 112 via bus 118. It should be understood that, although not shown, other hardware and/or software components could be used in conjunction with computer system/server 112. Examples include, but are not limited to, microcode, device drivers, redundant processing units, external disk drive arrays, RAID systems, tape drives, and data archival storage systems, etc.

Figure 2:
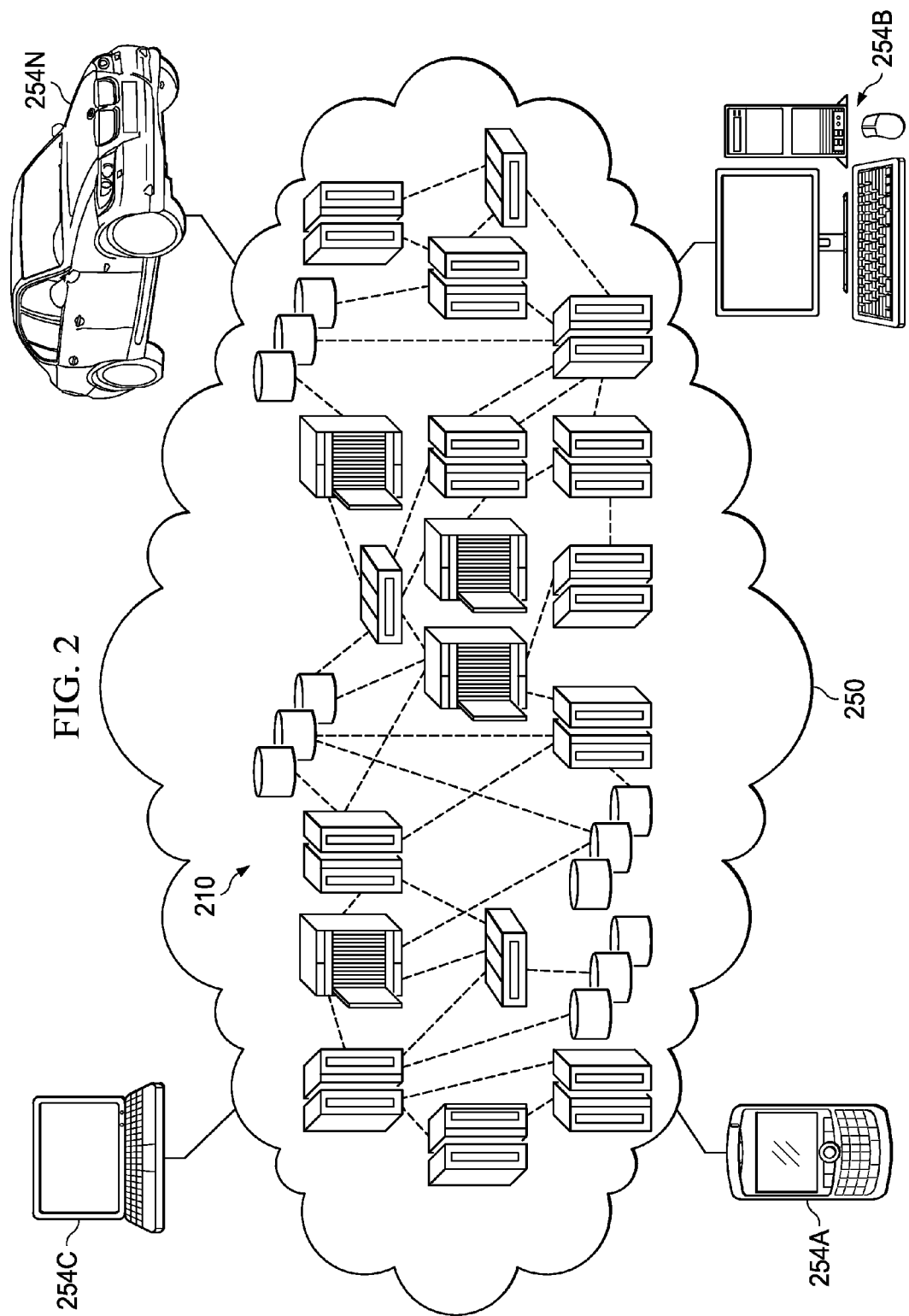
FIG. 2 is an illustration of a cloud computing environment in accordance with an illustrative embodiment.

Referring now to FIG. 2, an illustration of a cloud computing environment is depicted in accordance with an illustrative embodiment. In this illustrative example, cloud computing environment 250 comprises one or more cloud computing nodes 210 with which local computing devices used by cloud consumers may communicate. For example, cloud computing node 110 in FIG. 1 is one example of cloud computing nodes 210. Local computing devices which may communicate with cloud computing nodes 210 may include, for example, personal digital assistant (PDA) or cellular telephone 254A, desktop computer 254B, laptop computer 254C, and/or automobile computer system 254N. Cloud computing nodes 210 may communicate with one another. They may be grouped (not shown) physically or virtually, in one or more networks, such as private, community, public, or hybrid clouds as described hereinabove or a combination thereof. This allows cloud computing environment 250 to offer infrastructure, platforms, and/or software as services for which a cloud consumer does not need to maintain resources on a local computing device. It is understood that the types of computing devices 254A, 254B, 254C, and 254N shown in FIG. 2 are intended to be illustrative only and that cloud computing nodes 210 and cloud computing environment 250 can communicate with any type of computerized device over any type of network and/or network addressable connection (e.g., using a web browser). Program code located on one of cloud computing nodes 210 may be stored on a computer recordable storage medium in one of cloud computing nodes 210 and downloaded to a computing device within computing devices 254A, 254B, 254C, and 254N over a network for use in these computing devices. For example, a server computer in cloud computing nodes 210 may store program code on a computer readable storage medium on the server computer. The server computer may download the program code to a client computer in computing devices 254A, 254B, 254C, and 254N for use on the client computer.

Figure 3:
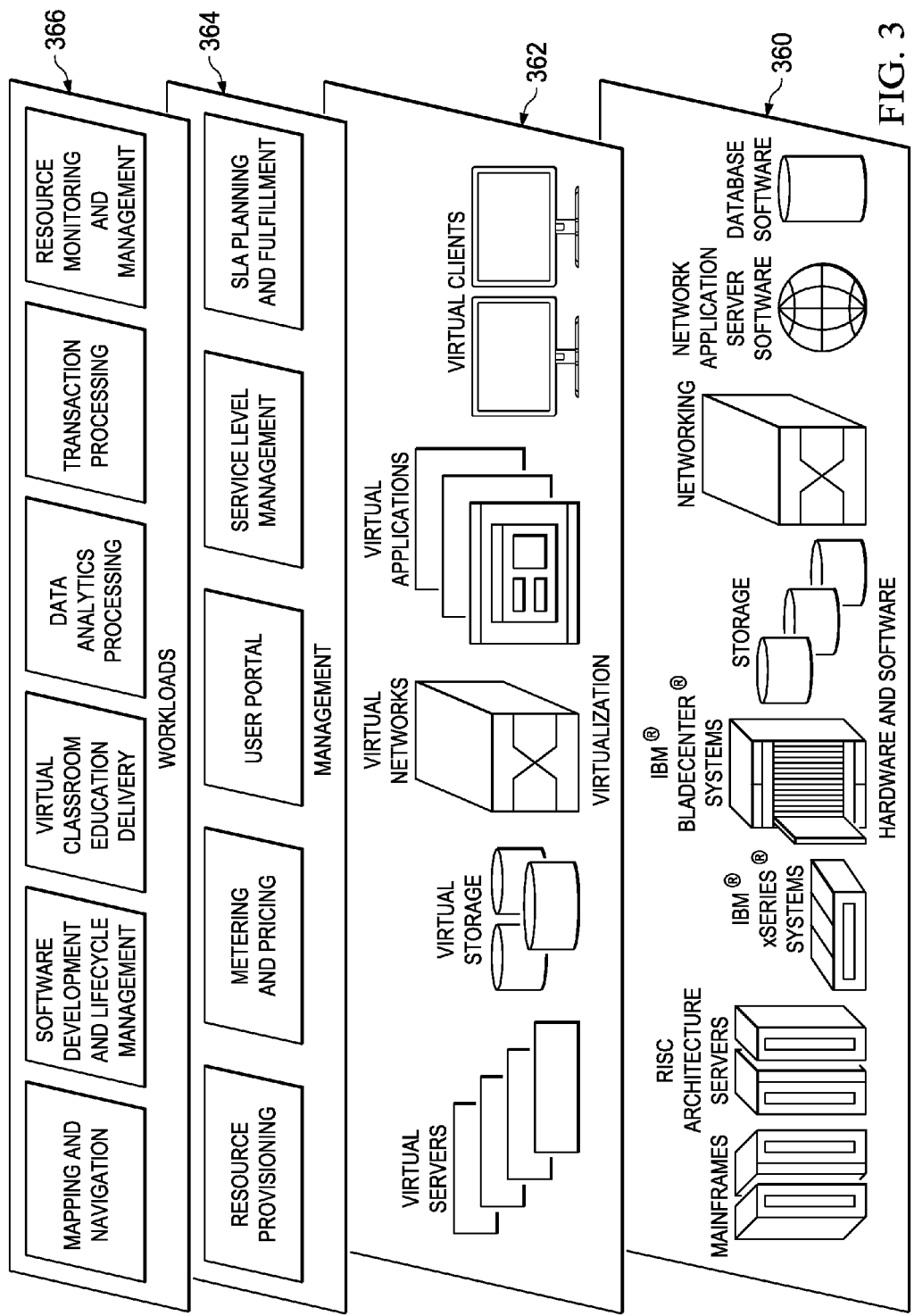
FIG. 3 is a set of functional abstraction layers in accordance with an illustrative embodiment.

Referring now to FIG. 3, a set of functional abstraction layers is depicted in accordance with an illustrative embodiment. The set of functional abstraction layers may be provided by cloud computing environment 250 in FIG. 2. It should be understood in advance that the components, layers, and functions shown in FIG. 3 are intended to be illustrative only and illustrative embodiments are not limited thereto. As depicted, the following layers and corresponding functions are provided:

Hardware and software layer 360 includes hardware and software components. Examples of hardware components include mainframes, in one example IBM® zSeries® systems; RISC (Reduced Instruction Set Computer) architecture based servers, in one example IBM® pSeries® systems; IBM® xSeries® systems; IBM® BladeCenter® systems; storage devices; networks and networking components. Examples of software components include network application server software, in one example IBM® WebSphere® application server software; and database software, in one example IBM® DB2® database software. (IBM®, zSeries®, pSeries®, xSeries®, BladeCenter®, WebSphere®, and DB2® are trademarks of International Business Machines Corporation registered in many jurisdictions worldwide)

Virtualization layer 362 provides an abstraction layer from which the following examples of virtual entities may be provided: virtual servers; virtual storage; virtual networks including virtual private networks; virtual applications and operating systems; and virtual clients.

In one example, management layer 364 may provide the functions described below. Resource provisioning provides dynamic procurement of computing resources and other resources that are utilized to perform tasks within the cloud computing environment. Metering and pricing provide usage and cost tracking as resources are utilized within the cloud computing environment and billing or invoicing for consumption of these resources. In one example, these resources may comprise application software licenses. Security provides identity verification for cloud consumers and tasks as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 366 provides examples of functionality for which the cloud computing environment may be utilized. Examples of workloads and functions which may be provided from this layer include: mapping and navigation; software development and lifecycle management; virtual classroom education delivery; data analytics processing; transaction processing; and resource monitoring and management processing.

The different illustrative embodiments recognize and take into account a number of different considerations. For example, the different illustrative embodiments recognize and take into account that many enterprises have an existing investment in information technology resources. These enterprises want to use their existing infrastructure, software, and management resources. Such enterprises, at times, also may want to augment their own data processing resources selectively with cloud based services. Thus, for economic and functional reasons, there may be a need to use on-premise enterprise infrastructure, platform, applications, or data and off-premise cloud service infrastructure, platform, applications, or data in an integrated manner.

The different illustrative embodiments recognize and take into account that in cases of cloud computing, server, network, data, and applications used in processing, the enterprise workload may reside within an enterprise datacenter, may be with partners of the enterprise, or may reside over the Internet in a public cloud. Thus, processing a workload using a combination of on-premise enterprise resources and public cloud resources involves using some of the on-premise infrastructure, platform, applications, or data as well as some off-premise cloud based services and data. Cloud computing solutions of this type may create integration, interoperability, and management problems.

For example, the different illustrative embodiments recognize and take into account that cloud computing consumers desire to maintain a seamless interface across on-premise and off-premise cloud boundaries. However, the governing policies for cloud operation and security related procedures always need to be in place. These competing requirements create the need for an integrated infrastructure and management solution that can span across the consumer datacenter and into one or more public cloud environments.

The different illustrative embodiments recognize and take into account that easy access to public cloud services allows such services to be consumed within an enterprise in a non-centralized and unmanaged manner. De-centralizing and moving data processing resources to off-site vendors increases the complexity and time required to support them. Typically, this complexity is only evident when the cloud resources being consumed are reported to the enterprise information technology department. Security and system governance lapses may result from this lack of management. Regulatory and business compliance may require policy based data sharing across a hybrid cloud. However, current unmanaged methods for accessing cloud service resources cannot guarantee such compliance.

The different illustrative embodiments recognize and take into account that policy based workload management across a hybrid cloud and automated support of cloud computing services will reduce information technology costs. Such hybrid cloud management and support will improve security and compliance and thereby will increase enterprise adoption of cloud technologies.

The different illustrative embodiments recognize and take into account the desirability of a vender neutral and service specific interface to all clouds that provide a desired cloud service. The different illustrative embodiments also recognize and take into account the desirability of controlling cloud vendor selection based on business conditions.

A hybrid cloud integrator, in accordance with an illustrative embodiment, provides for integration of on-premise infrastructure, platform, applications, and data with public cloud based infrastructure, platform, services and data. A hybrid cloud integrator in accordance with an illustrative embodiment may be used to extend on-premise datacenter capabilities by augmenting such capabilities with data processing capabilities provided in a public cloud. For example, such cloud based capabilities may include infrastructure as a service or storage as a service capabilities. In accordance with an illustrative embodiment, the desired solution for processing a workload may be implemented in a hybrid cloud environment that integrates multiple private cloud and public cloud based services.

A hybrid cloud integrator, in accordance with an illustrative embodiment, may be used to extend the reach of a consumer's on-premise data processing management functionality to manage the data processing resource capabilities extended in a public cloud. In accordance with an illustrative embodiment, a hybrid cloud computing environment including both private cloud and public cloud based services may be managed in a more effective manner as a single logical cloud of resources. Hybrid cloud integration, in accordance with an illustrative embodiment, allows policy based integration of infrastructure, services, and data across the hybrid cloud. In accordance with an illustrative embodiment, management of the integrated infrastructure and services can be performed in a centralized manner. In this way, workload specific actions can be taken consistently and in a vendor neutral manner even if the components of the workload are processed using multiple cloud based services.

A hybrid cloud integrator, in accordance with an illustrative embodiment, may comprise a hybrid cloud integration framework. Hybrid cloud integration components may be plugged in to the hybrid cloud integration framework as needed in a systematic manner.

The different illustrative embodiments recognize and take into account that current cloud based services accessible over the internet are provided by multiple vendors. Multiple vendors offer directly competing services. For example, both IBM SBDTC and Amazon EC2 offer infrastructure as a service cloud services. Different protocols and application programming interfaces are required for interfacing with these competing services. Currently, consumers of these services have to develop and maintain vendor-specific code to access the same service from different vendors. Consumers of cloud computing services would prefer to maintain a single vendor neutral and service specific interface to all clouds that provide a desired service. Consumers also desire to control vendor selection based on business considerations.

In accordance with an illustrative embodiment, a cloud service broker may be provided as a plug-in for a hybrid cloud integrator. The cloud service broker provides a single vendor neutral interface for provisioning resources from multiple clouds for use by a consumer of data processing resources. Knowledge of the protocols and application programming interfaces required for interfacing with competing services is made invisible to the consumer accessing cloud resources via the cloud service broker. The cloud service broker also may implement policies for controlling cloud service vendor selection based on business considerations.

Figure 4:
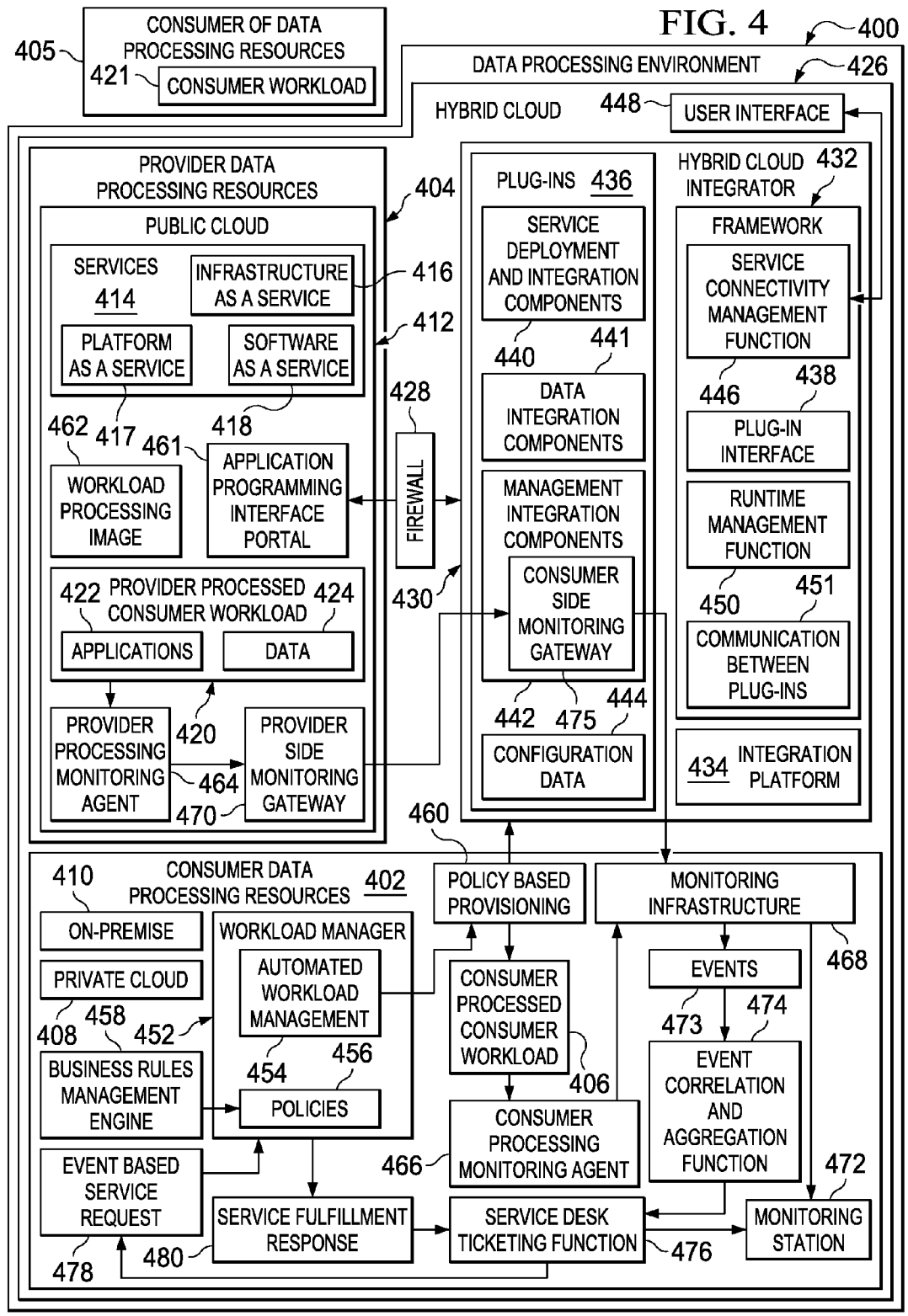
FIG. 4 is a block diagram of a data processing environment employing hybrid cloud integration in accordance with an illustrative embodiment.

Referring now to FIG. 4, a block diagram of a data processing environment employing hybrid cloud integration is depicted in accordance with an illustrative embodiment. Data processing environment 400 includes consumer data processing resources 402 and provider data processing resources 404. In some embodiments, provider data processing resources 404 may be referred to as first data processing resources, and consumer data processing resources 402 may be referred to as second data processing resources or vice versa.

Consumer data processing resources 402 may include data processing resources that are owned or controlled exclusively by consumer of data processing resources 405. For example, consumer of data processing resources 405 may be a business entity or other organization or enterprise that uses consumer data processing resources 402 to process consumer processed consumer workload 406.

Consumer data processing resources 402 may include any combination of data processing systems and devices for processing consumer processed consumer workload 406. For example, consumer data processing resources 402 may include any combination of data processing infrastructure, networks, processors, data storage, databases, and applications.

Consumer data processing resources 402 may include or may be referred to as private cloud 408. Consumer data processing resources 402 may include data processing resources that are located on-premise 410 or may be referred to as being on-premise 410. In this case, on-premise 410 may mean that all of consumer data processing resources 402 are co-located in a single location that is owned or controlled by consumer of data processing resources 405 that also owns or controls consumer data processing resources 402. Alternatively, on-premise 410 may mean that consumer data processing resources 402 are under the control of consumer of data processing resources 405 for exclusive use by consumer of data processing resources 405, even though some or all of consumer data processing resources 402 are physically located in a number of remote locations.

Provider data processing resources 404 are data processing resources that are available to be shared by a number of consumers of data processing resources, including consumer of data processing resources 405. Provider data processing resources 404 may include any combination of data processing systems or devices. For example, provider data processing resources 404 may include any combination of data processing infrastructure, networks, processors, data storage, or applications.

Provider data processing resources 404 may be provided as services 414. For example, provider data processing resources 404 may be provided as services 414 by public cloud 412. Public cloud 412 makes provider data processing resources 404 available to consumer of data processing resources 405 as services 414. For example, services 414 may include one or more of infrastructure as a service 416, platform as a service 417, software as a service 418, or other data processing related services.

At certain times, consumer of data processing resources 405 may use provider data processing resources 404 to process provider processed consumer workload 420. Provider processed consumer workload 420 typically is a portion of the entire consumer workload 421 that consumer of data processing resources 405 needs to be processed. In some cases, provider processed consumer workload 420 may be the entire consumer workload 421 that consumer of data processing resources 405 needs to be processed. For example, consumer of data processing resources 405 may use provider data processing resources 404 to process provider processed consumer workload 420 when consumer data processing resources 402 are overloaded processing consumer processed consumer workload 406. At other times, consumer of data processing resources 405 may employ provider data processing resources 404 to process provider processed consumer workload 420 when processing of provider processed consumer workload 420 is not one of the core competencies of consumer of data processing resources 405. As another example, consumer of data processing resources 405 may use provider data processing resources 404 to process provider processed consumer workload 420 when particular applications required to process provider processed consumer workload 420 are not available among consumer data processing resources 402. In any case, processing of provider processed consumer workload 420 using provider data processing resources 404 may require that a number of applications 422 or data 424, or both applications 422 and data 424, be provided to provider data processing resources 404 in order to process provider processed consumer workload 420.

Thus, at times, the entire consumer workload 421 being processed by or for consumer of data processing resources 405 may be processed in part as consumer processed consumer workload 406 on consumer data processing resources 402, such as private cloud 408, and in part as provider processed consumer workload 420 on provider data processing resources 404, such as public cloud 412. In this case, the integration of private cloud 408 and public cloud 412 to process consumer workload 421 for consumer of data processing resources 405 forms hybrid cloud 426.

Operation of hybrid cloud 426 requires communication between consumer data processing resources 402 and provider data processing resources 404. However, security concerns may require the prevention of unauthorized access to consumer data processing resources 402 from provider data processing resources 404 or from any other unauthorized sources. Therefore, firewall 428 may be provided between consumer data processing resources 402 and provider data processing resources 404. Firewall 428 is designed to block unauthorized access to consumer data processing resources 402 by provider data processing resources 404 or by any other resources on the internet while permitting authorized communications between consumer data processing resources 402 and provider data processing resources 404. Firewall 428 may be implemented in either hardware or software or using a combination of both hardware and software. For example, without limitation, firewall 428 may be implemented in consumer data processing resources 402.

In accordance with an illustrative embodiment, hybrid cloud integrator 430 provides integration across consumer data processing resources 402 and provider data processing resources 404 to implement integrated data processing resources forming hybrid cloud 426. For example, without limitation, hybrid cloud integrator 430 may be implemented by consumer of data processing resources 405 on consumer data processing resources 402.

In accordance with an illustrative embodiment, hybrid cloud integrator 430 includes framework 432, integration platform 434, and number of plug-ins 436. For example, framework 432 may be implemented in software as a software framework. Framework 432 may be implemented on integration platform 434. Integration platform 434 provides the underlying hardware and software required to implement hybrid cloud integrator 430. For example, integration platform 434 may include the hardware, operating system, and runtime environment in which hybrid cloud integrator 430 is implemented.

Framework 432 provides plug-in interface 438. Plug-in interface 438 allows number of plug-ins 436 to be installed in hybrid cloud integrator 430. Plug-ins 436 are software components that are configured to provide functionality for integrated use of consumer data processing resources 402 and provider data processing resources 404. Plug-ins 436 may include, for example, number of service deployment and integration components 440, number of data integration components 441, and number of management integration components 442.

In accordance with an illustrative embodiment, service deployment and integration components 440 may be used by consumer of data processing resources 405 to deploy services 414 in provider data processing resources 404 that are needed to process provider processed consumer workload 420. Service deployment and integration components 440 also may be used to integrate services 414 deployed in provider data processing resources 404 with consumer data processing resources 402 to provide integrated data processing resources to process consumer workload 421.

Data integration components 441 may be used by consumer of data processing resources 405 to migrate, replicate, transform, and integrate data used in processing consumer workload 421 between consumer data processing resources 402 and provider data processing resources 404. Service deployment and integration components 440 and data integration components 441 may be used to enforce workload and data specific deployment and integration policies specified by consumer of data processing resources 405.

Management integration components 442 may include any components that may be used by consumer of data processing resources 405 to monitor and manage the processing of provider processed consumer workload 420 by provider data processing resources 404. For example, management integration components 442 may include monitoring integration components. Monitoring integration components may be used by consumer of data processing resources 405 to monitor the processing of provider processed consumer workload 420 by provider data processing resources 404 in order to manage such processing. Management integration components 442 may also, or alternatively, include metering components or secure connectivity management components or other management related components.

The operating characteristics of plug-ins 436 are defined by configuration data 444. In accordance with an illustrative embodiment, framework 432 provides service connectivity management function 446. Service connectivity management function 446 allows current configuration data 444 from plug-ins 436, and other information about plug-ins 436, to be made available to a user on user interface 448. Service connectivity management function 446 also allows configuration data 444 to be received from user interface 448 for plug-ins 436. Thus, service connectivity management function 446 provides a connection between plug-ins 436 and user interface 448 allowing users to view and change the operating configuration of plug-ins 436 via user interface 448.

Framework 432 also provides runtime management function 450. Runtime management function 450 provides for managing operation of plug-ins 436 during operation thereof. Specifically, runtime management function 450 may provide for activating plug-ins 436 and for controlling operation of plug-ins 436 after plug-ins 436 are activated.

Framework 432 also may provide for communication between plug-ins 451. Communication between plug-ins 451 allows plug-ins 436 to interact with each other. For example, communication between plug-ins 451 allows one of plug-ins 436 to access and make use of the functionality provided by another of plug-ins 436 in framework 432.

In accordance with an illustrative embodiment, hybrid cloud integrator 430 provides flexible and reliable automated integration of data processing resources to process a workload. For example, hybrid cloud integrator 430 may be used by workload manager 452 to access provider data processing resources 404 automatically when needed to supplement consumer data processing resources 402. Hybrid cloud integrator 430 also may be used by workload manager 452 to monitor the operation of provider data processing resources 404 while processing provider processed consumer workload 420.

Workload manager 452 provides automated workload management 454. Automated workload management 454 includes automatically managing workload processing on available data processing resources. An example of a system that provides this type of automated workload management is the IBM® Tivoli® Service Automation Manager, TSAM, available from International Business Machines Corporation. Illustrative embodiments may be used, however, in combination with any currently available workload manager providing automated workload management functions or with any workload manager that may become available in the future. Illustrative embodiment also may be used in combination with workload managers in which automated workload management functions are implemented in combination with a human operator.

Workload manager 452 may provide automated workload management 454 based on policies 456. Policies 456 define the limiting parameters under which workload manager 452 may use available data processing resources. For example, policies 456 may define when or under what conditions workload manager 452 may use provider data processing resources 404 to process consumer workload 421. Policies 456 also may specify which specific provider data processing resources 404 may be used to process consumer workload 421. Policies 456 also may specify consumer data that may be replicated and accessed by provider data processing resources 404 and the portion of consumer workload 421 that may be processed by provider data processing resources 404. Policies 456 may specify security and privacy constraints that must be applied for processing consumer workload 421 by provider data processing resources 404.

Policies 456 may be developed using business rules management engine 458. Business rules management engine 458 may take into consideration a variety of business related and other factors to determine policies 456. For example, factors used by business rules management engine 458 to determine policies 456 may include financial, security, compliance, and customer relations factors, or others.

Workload manager 452 may provide automatic policy based provisioning 460 based on policies 456. For example, policy based provisioning 460 may call for the provisioning of provider data processing resources 404 to process provider processed consumer workload 420. In this case, workload manager 452 may use hybrid cloud integrator 430 to deploy provider data processing resources 404 needed to process provider processed consumer workload 420. For example, service deployment and integration components 440 may be used to deploy services 414 in public cloud 412 that are needed to process provider processed consumer workload 420. Service deployment and integration components 440 may establish communication with provider data processing resources 404 through firewall 428. For example, such communication may be established via application programming interface portal 461 in public cloud 412. Applications 422, data 424, or both applications 422 and data 424 needed for processing provider processed consumer workload 420, may be provided to provider data processing resources 404 by workload manager 452 via hybrid cloud integrator 430.

Hybrid cloud integrator 430 also may be used to establish workload processing image 462 in public cloud 412. Workload processing image 462 pre-defines services 414 needed to process provider processed consumer workload 420. By establishing workload processing image 462 in advance, provider data processing resources 404 needed to process provider processed consumer workload 420 may be deployed more rapidly when workload manager 452 determines that provider data processing resources 404 will be used for this purpose.

In accordance with an illustrative embodiment, hybrid cloud integrator 430 allows workload manager 452 to access provider data processing resources 404 as easily as consumer data processing resources 402. Plug-ins 436 in hybrid cloud integrator 430 handle all of the special requirements of provider data processing resources 404 needed to access those resources.

In accordance with an illustrative embodiment, hybrid cloud integrator 430 also provides for monitoring and management of the processing of provider processed consumer workload 420 by provider data processing resources 404. For example, service deployment and integration components 440 may be used to deploy services 414 in public cloud 412 to implement provider processing monitoring agent 464. Provider processing monitoring agent 464 collects data for monitoring the processing of provider processed consumer workload 420 by provider data processing resources 404. Similarly, consumer processing monitoring agent 466 may be implemented in consumer data processing resources 402. Consumer processing monitoring agent 466 collects data for monitoring the processing of consumer processed consumer workload 406 by consumer data processing resources 402.

Data from consumer processing monitoring agent 466 may be provided to monitoring infrastructure 468. Monitoring infrastructure 468 may be implemented in consumer data processing resources 402. Due to the security provided by firewall 428, provider processing monitoring agent 464 may not be allowed to push data to monitoring infrastructure 468 on the other side of firewall 428. In accordance with an illustrative embodiment, during runtime, monitoring components that are part of management integration components 442 installed in hybrid cloud integrator 430 may activate provider side monitoring gateway 470 in provider data processing resources 404. Provider side monitoring gateway 470 may be deployed in provider data processing resources 404 using service deployment and integration components 440 installed in hybrid cloud integrator 430. Data from provider processing monitoring agent 464 is provided to provider side monitoring gateway 470. Monitoring components in hybrid cloud integrator 430 may retrieve the monitored data from provider side monitoring gateway 470 via a connection. The monitoring components in hybrid cloud integrator 430 then may provide the monitored data from the provider side of hybrid cloud 426 to monitoring infrastructure 468. From the point of view of monitoring infrastructure 468, the monitoring components in hybrid cloud integrator 430 provide monitored data for provider side services 414 in the same manner as consumer processing monitoring agent 466 provides monitored data for consumer data processing resources 402.

Connection between hybrid cloud integrator 430 and provider side monitoring gateway 470 may be implemented using a hybrid cloud monitoring plug-in in hybrid cloud integrator 430. For example, the hybrid cloud monitoring plug-in may be one of management integration components 442 in hybrid cloud integrator 430. The monitoring plug-in may enable hybrid cloud monitoring by setting up and configuring provider side monitoring gateway 470 and consumer side monitoring gateway 475. For example, consumer side monitoring gateway 475 may be implemented in hybrid cloud integrator 430 on the consumer side of hybrid cloud 426. Consumer side monitoring gateway 475 connects to provider side monitoring gateway 470, negotiating firewall 428. Consumer side monitoring gateway 475 also connects with monitoring infrastructure 468 in consumer data processing resources 402. Using the connection from hybrid cloud integrator 430 to provider side monitoring gateway 470, consumer side monitoring gateway 475 may pull monitored data for provider data processing resources 404 that is collected by provider side monitoring gateway 470 across firewall 428 and then push the data to consumer side monitoring infrastructure 468.

In one embodiment, as just described, the connection between hybrid cloud integrator 430 is implemented via hybrid cloud integrator 430 to provide access through firewall 428 to information for monitoring the processing of provider processed consumer workload 420 in public cloud 412 by monitoring infrastructure 468. In other embodiments, the connection between hybrid cloud integrator 430 may be implemented separately from hybrid cloud integrator 430. For example, using a virtual private network, a secure connection may be established between monitoring infrastructure 468 and provider data processing resources 404 processing provider processed consumer workload 420 in public cloud 412 to implement a connection through firewall 428 without using the resources of hybrid cloud integrator 430.

Monitoring infrastructure 468 thus may receive monitoring information for provider data processing resources 404 that is obtained by provider processing monitoring agent 464 and monitoring information from consumer processing monitoring agent 466 for consumer data processing resources 402. Monitoring infrastructure 468 may process the received monitoring information to generate an integrated display of workload processing conditions for provider data processing resources 404 and consumer data processing resources 402. This integrated display may be presented to a user, such as a system administrator on monitoring station 472. Thus, in accordance with an illustrative embodiment, a display of workload processing conditions across hybrid cloud 426 may be presented to a user in an integrated manner. Such an integrated display allows a user to monitor and manage workload processing across hybrid cloud 426 in an integrated, effective, and efficient manner.

Monitoring infrastructure 468 also may look for and detect the occurrence of events 473 from the monitoring information provided by provider processing monitoring agent 464 and consumer processing monitoring agent 466. Events 473 may be defined by the occurrence of specified conditions or patterns in the monitored data. For example, monitored data exceeding a defined threshold for at least a specified time period may indicate the occurrence of one of events 473. In accordance with an illustrative embodiment, events 473 may be defined by the occurrence of any condition, state, or pattern of interest in the monitored data provided by provider processing monitoring agent 464 and consumer processing monitoring agent 466.

Events 473 may be provided as input to event correlation and aggregation function 474. Event correlation and aggregation function 474 may provide, and may be referred to as, an event correlation service. Event correlation and aggregation function 474 may aggregate and correlate events 473 over periods of time. Event correlation and aggregation function 474 may determine whether the aggregated and correlated events 473 indicate the presence of data processing conditions that should be or may be addressed to maintain or improve system performance. For example, event correlation and aggregation function 474 may determine that a series of detected events 473 has occurred indicating that consumer data processing resources 402 or provider data processing resources 404 are overloaded. Similarly, event correlation and aggregation function 474 may determine that a series of detected events 473 has occurred indicating that consumer data processing resources 402 or provider data processing resources 404 are being underutilized. In accordance with an illustrative embodiment, any data processing condition of interest that may be defined by aggregated or correlated events 473 may be detected by event correlation and aggregation function 474.

In response to a determination by event correlation and aggregation function 474 that a data processing condition of interest exists, service desk ticketing function 476 may send event based service request 478 to workload manager 452. For example, service desk ticketing function 476 may generate event based service request 478 in response to a determination by event correlation and aggregation function 474 that a data processing condition exists that should be or may be addressed to maintain or improve system performance. Event based service request 478 may indicate to workload manager 452 the particular condition that has been determined to exist. In this case, workload manager 452 may determine the appropriate action to take in response to the indicated condition. Alternatively, service desk ticketing function 476 may determine the action that needs to be taken in response to a particular condition that has been determined to exist. In this case, event based service request 478 may indicate to workload manager 452 the action that is being requested.

In any case, workload manager 452 may determine whether or not any action may be taken in response to a particular data processing condition based on policies 456. If workload manager 452 determines that action will be taken in response to a particular data processing condition, workload manager 452 may implement such action based on policies 456. For example, workload manager 452 may respond to event based service request 478 by implementing appropriate policy based provisioning 460 of data processing resources as needed to respond to a detected data processing condition.

Workload manager 452 also may respond to event based service request 478 by generating service fulfillment response 480. For example, service fulfillment response 480 may be generated by workload manager 452 and delivered to service desk ticketing function 476. Service fulfillment response 480 may indicate that event based service request 478 has been received by workload manager 452. Service fulfillment response 480 also may indicate that appropriate action has been taken, or will be taken, in response to event based service request 478. In this case, service fulfillment response 480 may or may not specify the particular action taken, or to be taken, by workload manager 452 in response to event based service request 478. In some cases, workload manager 452 may not be able to take action to change data processing conditions in response to event based service request 478. For example, policies 456 may prevent workload manager 452 from taking action in response to event based service request 478 at a particular time. In this case, service fulfillment response 480 may indicate that action will not be taken by workload manager 452 in response to event based service request 478 or that the implementation of such action may be delayed. Policies 456, responsible for such a failure to act or for such a delay, may or may not be identified in service fulfillment response 480.

The information provided by event based service request 478 and service fulfillment response 480 may be formatted appropriately and displayed for a user on monitoring station 472. By displaying information from event based service request 478 and service fulfillment response 480 in this manner, a user is able to monitor the detection of data processing system conditions for which an appropriate action may be taken and the response of workload manager 452 to the detection of such conditions.

In accordance with an illustrative embodiment, hybrid cloud integrator 430 makes it possible for workload manager 452 to respond to determined data processing conditions of interest in consumer data processing resources 402, in provider data processing resources 404, or both. Furthermore, hybrid cloud integrator 430 makes it possible for workload manager 452 to access consumer data processing resources 402, provider data processing resources 404, or both, for responding to determined conditions of interest. Thus, hybrid cloud integrator 430 makes it possible for workload manager 452 to provide integrated data processing resource management across hybrid cloud 426 by providing for monitoring of data processing conditions across hybrid cloud 426 and by providing access to data processing resources across hybrid cloud 426 when responding to such conditions.

For example, as discussed above, hybrid cloud integrator 430 may be used to establish monitoring of the processing of portions of consumer workload 421 by provider data processing resources 404 while processing of other portions of consumer workload 421 by consumer data processing resources 402 also is monitored at the same time. Based on such monitoring, an overload condition or underutilization condition on consumer data processing resources 402, on provider data processing resources 404, or both, may be determined. In response to such a determination, workload manager 452 may activate or deactivate selected consumer data processing resources 402, may deploy or release selected provider data processing resources 404 using hybrid cloud integrator 430 in the manner described above, or both. Processing of portions of consumer workload 421 then may be allocated by workload manager 452 across the reconfigured resources of hybrid cloud 426 to remedy the determined overload or underutilization condition. The particular action taken by workload manager 452 in response to the determined condition may be determined by policies 456.

The illustration of FIG. 4 is not meant to imply physical or architectural limitations to the manner in which different illustrative embodiments may be implemented. Other components in addition to and/or in place of the ones illustrated may be used. Some components may be unnecessary in some illustrative embodiments. Also, the blocks are presented to illustrate some functional components. One or more of these blocks may be combined and/or divided into different blocks when implemented in different illustrative embodiments.

For example, hybrid cloud 426 may include more than public cloud 412 in combination with private cloud 408. Hybrid cloud 426 may include multiple private clouds, community clouds, or public clouds in any combination. In accordance with an illustrative embodiment, hybrid cloud integrator 430 may be used to provide integration of data processing resources across multiple private, public, and community clouds in any combination.

Furthermore, hybrid cloud integrator 430, in accordance with an illustrative embodiment, may be used to provide integrated monitoring and management across hybrid cloud 426 that is related to data processing conditions other than data processing resource overload and underutilization conditions. For example, hybrid cloud integrator 430, in accordance with an illustrative embodiment, may be used to provide integrated management across hybrid cloud 426 of monitoring, metering, security, or any other data processing related conditions.

Integrated monitoring and management of hybrid cloud 426 using hybrid cloud integrator 430, in accordance with an illustrative embodiment, may be implemented automatically using an automated management system, such as workload manger 452. Alternatively, monitoring and management using hybrid cloud integrator 430, in accordance with an illustrative embodiment, may be provided by a human system manager using appropriate system interfaces, such as user interface 448 or monitoring station 472 in combination with other appropriate system interfaces. Monitoring and management using hybrid cloud integrator 430, in accordance with an illustrative embodiment, may be provided by an automated management system and a human system manager operating together.

Figure 5:
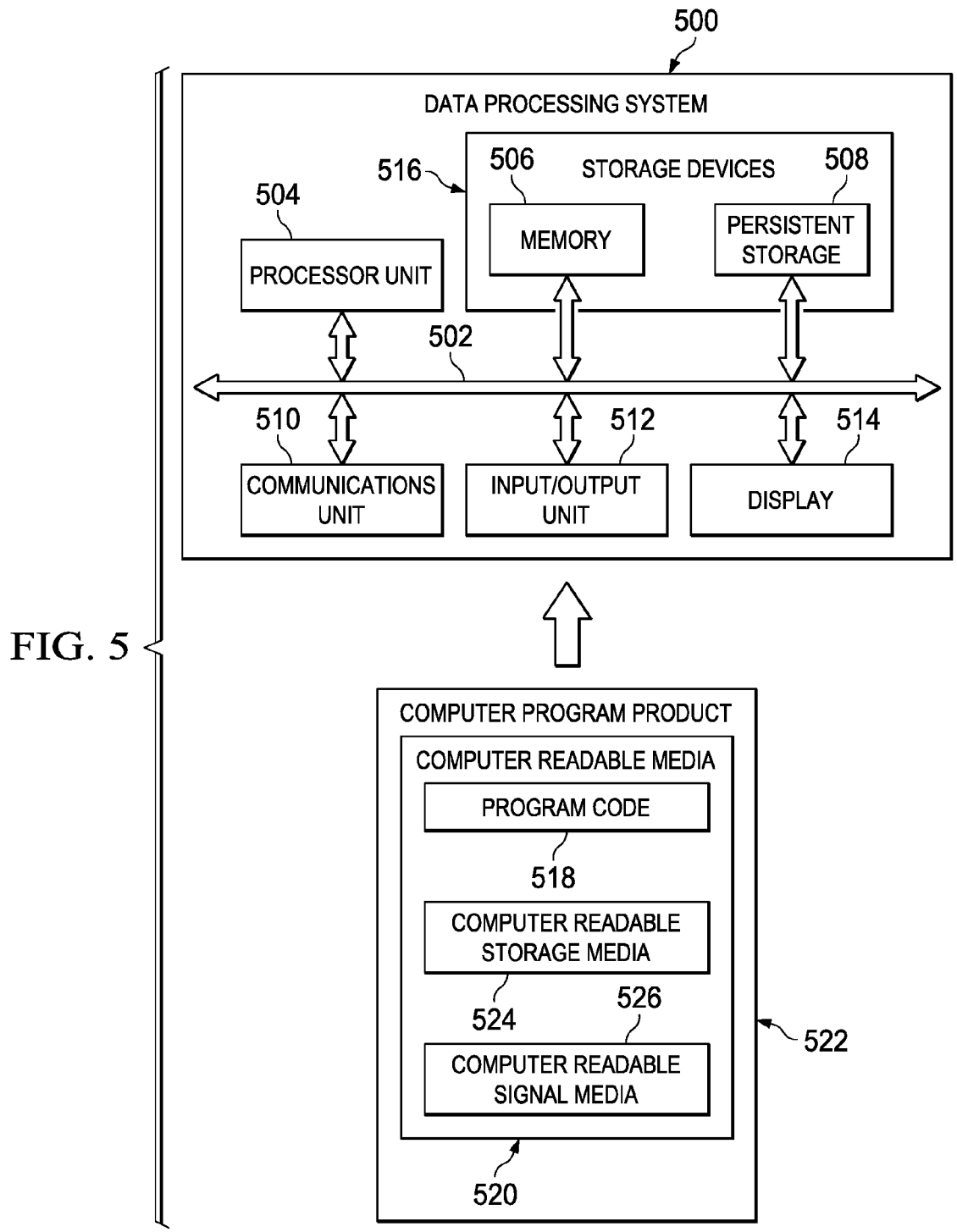
FIG. 5 is a block diagram of a data processing system in accordance with an illustrative embodiment.

Referring now to FIG. 5, a block diagram of a data processing system is depicted in accordance with an illustrative embodiment. In this example, data processing system 500 is one example of a data processing system that may be used to implement consumer data processing resources 402 and provider data processing resources 404 in FIG. 4. In this illustrative example, data processing system 500 includes communications fabric 502, which provides communications between processor unit 504, memory 506, persistent storage 508, communications unit 510, input/output (I/O) unit 512, and display 514.

Processor unit 504 serves to execute instructions for software that may be loaded into memory 506. Processor unit 504 may be a number of processors, a multi-processor core, or some other type of processor, depending on the particular implementation. A number, as used herein with reference to an item, means one or more items. Further, processor unit 504 may be implemented using a number of heterogeneous processor systems in which a main processor is present with secondary processors on a single chip. As another illustrative example, processor unit 504 may be a symmetric multi-processor system containing multiple processors of the same type.

Memory 506 and persistent storage 508 are examples of storage devices 516. A storage device is any piece of hardware that is capable of storing information, such as, for example, without limitation, data, program code in functional form, and/or other suitable information either on a temporary basis and/or a permanent basis. Storage devices 516 also may be referred to as computer readable storage devices in these examples. Memory 506, in these examples, may be, for example, a random access memory or any other suitable volatile or non-volatile storage device. Persistent storage 508 may take various forms, depending on the particular implementation.

For example, persistent storage 508 may contain one or more components or devices. For example, persistent storage 508 may be a hard drive, a flash memory, a rewritable optical disk, a rewritable magnetic tape, or some combination of the above. The media used by persistent storage 508 also may be removable. For example, a removable hard drive may be used for persistent storage 508.

Communications unit 510, in these examples, provides for communications with other data processing systems or devices. In these examples, communications unit 510 is a network interface card. Communications unit 510 may provide communications through the use of either or both physical and wireless communications links.

Input/output unit 512 allows for input and output of data with other devices that may be connected to data processing system 500. For example, input/output unit 512 may provide a connection for user input through a keyboard, a mouse, and/or some other suitable input device. Further, input/output unit 512 may send output to a printer. Display 514 provides a mechanism to display information to a user.

Instructions for the operating system, applications, and/or programs may be located in storage devices 516, which are in communication with processor unit 504 through communications fabric 502. In these illustrative examples, the instructions are in a functional form on persistent storage 508. These instructions may be loaded into memory 506 for execution by processor unit 504. The processes of the different embodiments may be performed by processor unit 504 using computer implemented instructions, which may be located in a memory, such as memory 506.

These instructions are referred to as program instructions, program code, computer usable program code, or computer readable program code that may be read and executed by a processor in processor unit 504. The program code in the different embodiments may be embodied on different physical or computer readable storage media, such as memory 506 or persistent storage 508.

Program code 518 is located in a functional form on computer readable media 520 that is selectively removable and may be loaded onto or transferred to data processing system 500 for execution by processor unit 504. Program code 518 and computer readable media 520 form computer program product 522 in these examples. In one example, computer readable media 520 may be computer readable storage media 524 or computer readable signal media 526. Computer readable storage media 524 may include, for example, an optical or magnetic disk that is inserted or placed into a drive or other device that is part of persistent storage 508 for transfer onto a storage device, such as a hard drive, that is part of persistent storage 508. Computer readable storage media 524 also may take the form of a persistent storage, such as a hard drive, a thumb drive, or a flash memory, that is connected to data processing system 500. In some instances, computer readable storage media 524 may not be removable from data processing system 500.

Alternatively, program code 518 may be transferred to data processing system 500 using computer readable signal media 526. Computer readable signal media 526 may be, for example, a propagated data signal containing program code 518. For example, computer readable signal media 526 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some advantageous embodiments, program code 518 may be downloaded over a network to persistent storage 508 from another device or data processing system through computer readable signal media 526 for use within data processing system 500. For instance, program code stored in a computer readable storage medium in a server data processing system may be downloaded over a network from the server to data processing system 500. The data processing system providing program code 518 may be a server computer, a client computer, or some other device capable of storing and transmitting program code 518.

The different components illustrated for data processing system 500 are not meant to provide architectural limitations to the manner in which different embodiments may be implemented. The different illustrative embodiments may be implemented in a data processing system including components in addition to or in place of those illustrated for data processing system 500. Other components shown in FIG. 5 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 504 may take the form of a hardware unit that has circuits that are manufactured or configured for a particular use. This type of hardware may perform operations without needing program code to be loaded into a memory from a storage device to be configured to perform the operations.

For example, when processor unit 504 takes the form of a hardware unit, processor unit 504 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, programmable array logic, a field programmable logic array, a field programmable gate array, and other suitable hardware devices. With this type of implementation, program code 518 may be omitted because the processes for the different embodiments are implemented in a hardware unit.

In still another illustrative example, processor unit 504 may be implemented using a combination of processors found in computers and hardware units. Processor unit 504 may have a number of hardware units and a number of processors that are configured to run program code 518. With this depicted example, some of the processes may be implemented in the number of hardware units, while other processes may be implemented in the number of processors.

As another example, a storage device in data processing system 500 is any hardware apparatus that may store data. Memory 506, persistent storage 508, and computer readable media 520 are examples of storage devices in a tangible form.

In another example, a bus system may be used to implement communications fabric 502 and may be comprised of one or more buses, such as a system bus or an input/output bus. Of course, the bus system may be implemented using any suitable type of architecture that provides for a transfer of data between different components or devices attached to the bus system. Additionally, communications unit 510 may include one or more devices used to transmit and receive data, such as a modem or a network adapter. Further, a memory may be, for example, memory 506, or a cache, such as found in an interface and memory controller hub that may be present in communications fabric 502.

Figure 6:
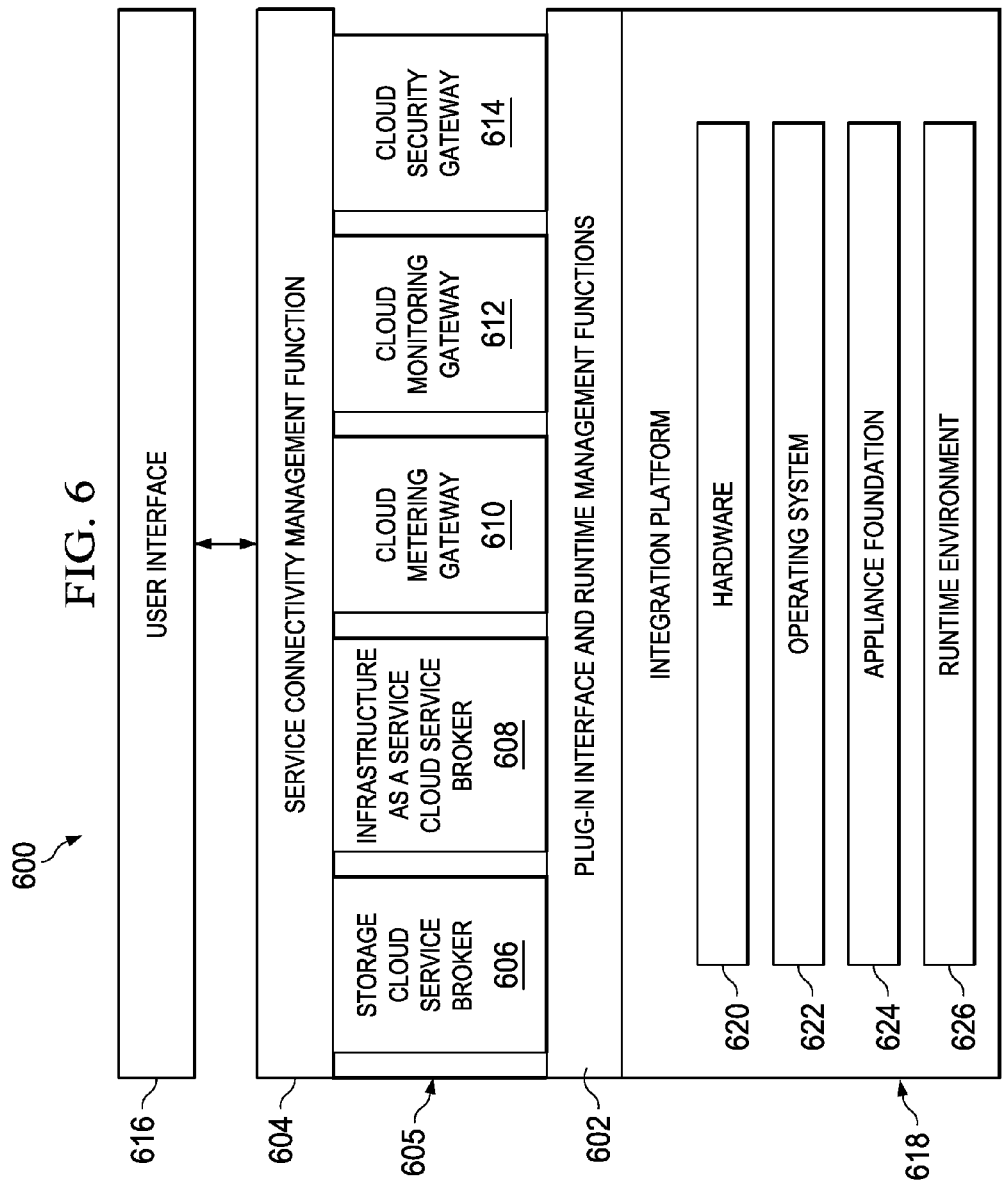
FIG. 6 is a block diagram of a hybrid cloud integrator in accordance with an illustrative embodiment.

Referring now to FIG. 6, a block diagram of a hybrid cloud integrator is depicted in accordance with an illustrative embodiment. In this example, hybrid cloud integrator 600 is an example of one implementation of hybrid cloud integrator 430 of FIG. 4. Hybrid cloud integrator 600 includes plug-in interface and runtime management functions 602 and service connectivity management function 604. In accordance with an illustrative embodiment, plug-in interface and runtime management functions 602 and service connectivity management function 604 are implemented in software framework 605. A number of plug-ins 606, 608, 610, 612, and 614 may be installed in hybrid cloud integrator 600 and managed during runtime using plug-in interface and runtime management functions 602.

Service connectivity management function 604 provides access to plug-ins 606, 608, 610, 612, and 614 via user interface 616. Service connectivity management function 604 allows an operator to manage the configuration and other parameters of plug-ins 606, 608, 610, 612, and 614 via user interface 616. Service connectivity management function 604 may be used to obtain information about plug-ins 606, 608, 610, 612, and 614, from plug-ins 606, 608, 610, 612, and 614 via user interface 616. For example, service connectivity management function 604 may allow a user to access configuration information and other information from plug-ins 606, 608, 610, 612, and 614 via user interface 616. Service connectivity management function 604 also may be used to provide configuration data and other parameter information to plug-ins 606, 608, 610, 612, and 614 via user interface 616. For example, service connectivity management function 604 allows a user to change configuration and other parameters of plug-ins 606, 608, 610, 612, and 614 via user interface 616. In accordance with an illustrative embodiment, service connectivity management function 604 may employ a common service connectivity management protocol for interaction between plug-ins 606, 608, 610, 612, and 614 and user interface 616. Thus, service connectivity management function 604 provides a common infrastructure for configuring plug-ins 606, 608, 610, 612, and 614.

Plug-in interface and runtime management functions 602 may provide various functions for installing and managing plug-ins 606, 608, 610, 612, and 614 during runtime. For example, plug-in interface and runtime management functions 602 may provide the following function for registering a plug-in as an integration provider in hybrid cloud integrator 600. This function causes the plug-in to be loaded into hybrid cloud integrator 600 and activated.

RegisterIntegrationProvider (ProviderName, LocationUrl), where

ProviderName is an unique name for the provider and LocationUrl is the physical location of the provider plug-in.

The following functions may be implemented by selected ones of plug-ins 606, 608, 610, 612, and 614 and are called by plug-in interface and runtime management functions 602.

GetIntegrationCapabilities ( ). This function returns one or more integration capabilities supported by a plug-in.

For each integration type

```
{
integration identifier
display name
display summary
display configuration
}
```

Get metadata for specific capability type. The metadata defines the configuration properties of a specific managed connection type.

GetOnPremiseEndpoints (IntegrationIdentifier). This function returns a list of configuration properties for one or more on-premise endpoints of integration identified by IntegrationIdentifier.

For each on-premise endpoint:

```
{
endpoint identifier
display name
display summary
display description
configuration property[0 ..n]
}.
```

For each configuration property:

```
{
configuration identifier
configuration type (boolean, integer, uint, etc.)
required or optional
default value
display name
display summary
display description
}.
```

GetOffPremiseEndpoints (IntegrationIdentifier) This function returns a list of configuration properties for one or more off-premise endpoints of integration identified by IntegrationIdentifier.

For each off-premise endpoint

```
{
endpoint identifier
display name
display summary
display description
configuration property[0 ..n]
}.
```

For each configuration property

```
{
configuration identifier
configuration type (boolean, integer, uint, etc.)
required or optional
default value
display name
display summary
display description
}.
```

Add instance of specific capability type. This function creates an instance of managed connection type. This function creates an instance of name InstanceName of an integration of type IntegrationType with the necessary endpoint configurations.

AddIntegration (IntegrationIdentifier, InstanceName, OnPremiseEndpointConfig, OffPremiseEndpointConfig), wherein:

```
OnPremiseEndpointConfig
{
endpoint identifier
configuration value [0..n]
}
OffPremiseEndpointConfig
{
endpoint identifier
configuration value [0..n]
}
configuration value
{
configuration identifier
configuration value
}.
```

Delete, start, stop the instance of specific integration type. This function updates an instance of specific capability type. This function is used to modify an instance of managed connection type. See AddIntegration ( . . . ).

DeleteIntegration (IntegrationIdentifier, InstanceName)

Get status of specific capability instance. This function is used to retrieve status data of the managed connection instance for hybrid cloud integration.

Get logs of specific capability instance. This function is used to retrieve log data of a service connectivity management function touchpoint instance.

Unregister plug-in. This function is used to shut down the plug-in and release all instances.

Plug-in interface and runtime management functions 602 in accordance with an illustrative embodiment may provide different functions from those functions listed as examples above.

Plug-ins 606, 608, 610, 612, and 614 may include, for example and without limitation, one or more of storage cloud service broker 606, infrastructure as a service cloud service broker 608, cloud metering gateway 610, cloud monitoring gateway 612, and cloud security gateway 614. In this example, storage cloud service broker 606 and infrastructure as a service cloud service broker 608 are examples of service deployment and integration components 440 in FIG. 4. In this example, cloud metering gateway 610, cloud monitoring gateway 612, and cloud security gateway 614 are examples of management integration components 442 in FIG. 4.

Hybrid cloud integrator 600 may be implemented on integration platform 618. For example, software framework 605 and plug-ins 606, 608, 610, 612, and 614 may be implemented for operation on integration platform 618. Integration platform 618 includes hardware 620. Hardware 620 may include data processing system hardware, such as computer hardware. For example, without limitation, hardware 620 may include IBM® WebSphere® Data Power 9004 1U appliance hardware. Operating system 622 runs on hardware 620. For example, without limitation, operating system 622 may include the IBM MCP 6.0 embedded LINUX operating system. Operating system 622 supports appliance foundation 624. For example, without limitation, appliance foundation 624 may include the IBM® WebSphere® BEDROCK appliance foundation. Runtime environment 626 is at the highest level of integration platform 618. For example, without limitation, runtime environment 626 may include a JAVA/sMASH runtime environment. In accordance with an illustrative embodiment, integration platform 618 may be implemented using hardware 620, operating system 622, appliance foundation 624, and runtime environment 626, components that are different from the components listed as examples herein.

Figure 7:
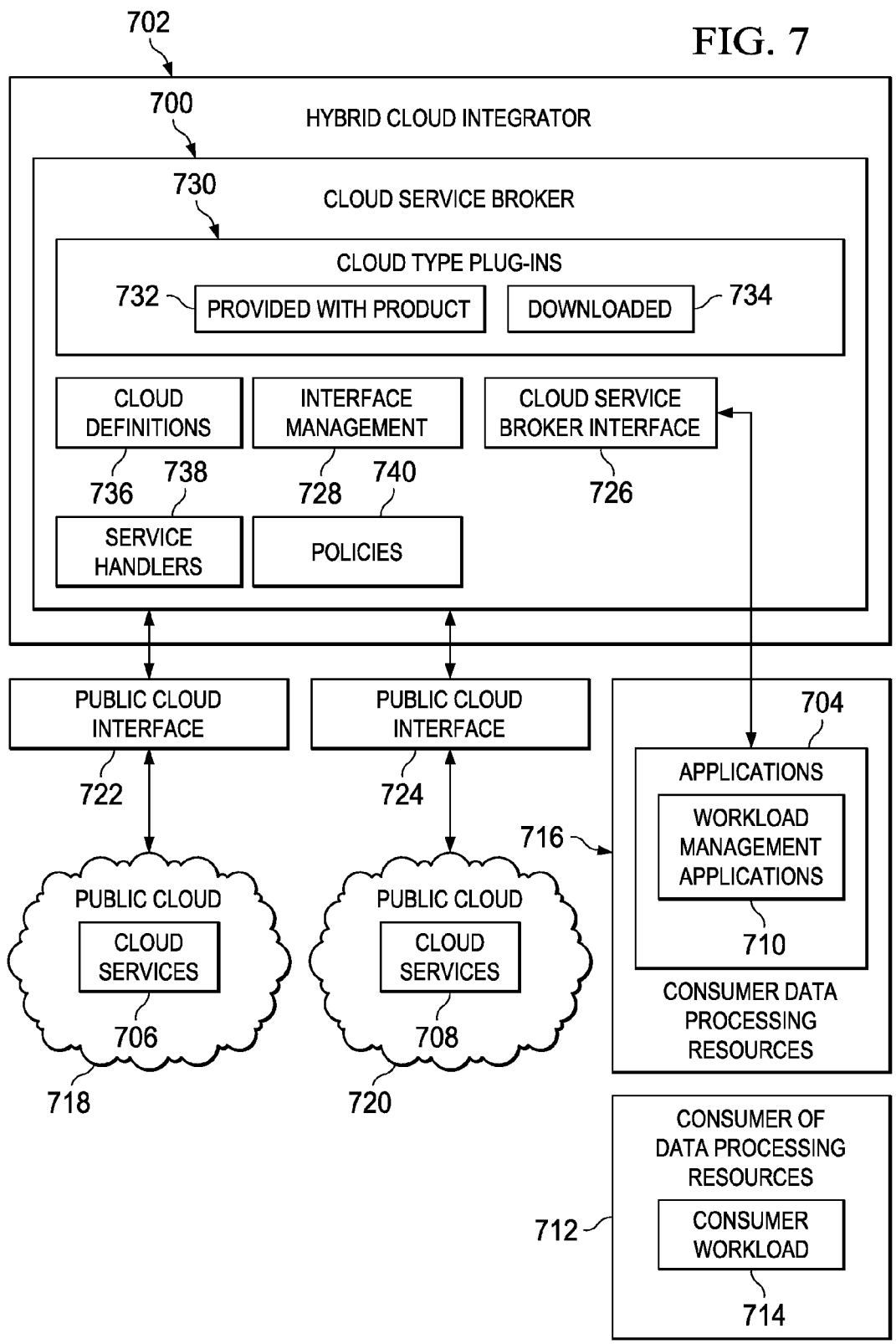
FIG. 7 is a functional block diagram of a cloud service broker plug-in in accordance with an illustrative embodiment.

A hybrid cloud integrator plug-in in accordance with an illustrative embodiment is described in more detail with reference to a specific example. Referring now to FIG. 7, a functional block diagram of a cloud service broker plug-in is depicted in accordance with an illustrative embodiment. Cloud service broker 700 is an example of a hybrid cloud integrator plug-in in accordance with an illustrative embodiment. In accordance with an illustrative embodiment, cloud service broker 700 is implemented as a plug-in component of hybrid cloud integrator 702. For example, cloud service broker 700 may be deployed in a software framework of hybrid cloud integrator 702, in the manner described above, to provide data processing services provisioning and management in a hybrid cloud. Cloud service broker 700 may be configured for a particular application via a user interface associated with hybrid cloud integrator 702. Use of cloud service broker 700, in accordance with an illustrative embodiment, thus centralizes configuration for cloud access.

Cloud service broker 700 may be, for example, an infrastructure as a service cloud service broker. An infrastructure, as a service cloud service broker, may be used to provision infrastructure as service cloud services. In this case, infrastructure as a service cloud service broker 608 in FIG. 6 may be an example of cloud service broker 700. Alternatively, cloud service broker 700 may be configured to provision and manage other types of cloud services.

In accordance with an illustrative embodiment, cloud service broker 700 may be used by applications 704 to provision cloud services 706 and 708. For example, applications 704 may include workload management applications 710. Workload management applications 710 may be used by consumer of data processing resources 712, for example, to allocate portions of consumer workload 714 for processing by cloud services 706 and 708. Applications 704 may be implemented on consumer data processing resources 716. For example, consumer data processing resources 716 may include a computer network that is owned or controlled by consumer of data processing resources 712 for the exclusive use of consumer of data processing resources 712.

Cloud services 706 and 708 may be data processing resources provided as services by public clouds 718 and 720, respectively. For example, cloud services 706 and 708 may include infrastructure as a service or other data processing resources provided as a service by public clouds 718 and 720. Public clouds 718 and 720 include public cloud interfaces 722 and 724, respectively. Public cloud interfaces 722 and 724 are the interfaces by which a consumer of data processing resources provisions and manages cloud services 706 and 708 for use. For example, public cloud interfaces 722 and 724 may include different application programming interfaces that are unique to each of public clouds 718 and 720. Although two public clouds, public clouds 718 and 720, are shown in FIG. 7, cloud service broker 700 may be used to provide cloud service provisioning and management for a single cloud of any type or for more than two clouds of any type.

In accordance with an illustrative embodiment, cloud service broker 700 provides cloud service broker interface 726. Cloud service broker interface 726 provides a single vendor neutral interface for provisioning and managing cloud services 706 and 708 from multiple public clouds 718 and 720. For example, cloud service broker 700 may be made accessible within consumer data processing resources 716 from a published location. Applications 704 and other users wishing to use cloud services 706 or 708 may access such services via cloud service broker interface 726 provided by cloud service broker 700. Applications 704 and other users requesting cloud provisioning or management services via cloud service broker interface 726 need not be aware of cloud specific configurations and public cloud interfaces 722 and 724.

Cloud service broker 700 may provide access to multiple vendor-provided cloud services, such as cloud services 706 and 708 using a centrally managed and administered component. For example, in accordance with an illustrative embodiment, cloud service broker 700 provides interface management 728 for managing public cloud interfaces 722 and 724 to public clouds 718 and 720. Cloud service broker 700 interfaces with individual vendor-provided cloud services, such as cloud services 706 and 708 using the appropriate vendor-specific public cloud interfaces 722 and 724 and associated protocols. In accordance with an illustrative embodiment, cloud service broker 700 manages vendor-specific requirements transparently to the clients of cloud service broker 700, such as applications 704. For example, addition, deletion, and modification in vendor-provided cloud services 706 and 708, protocols, or application programming public cloud interfaces 722 and 724 may be handled by cloud service broker 700 in a manner that is transparent to applications 704 and other users. Thus, applications 704 are shielded from library and application programming interface changes at the cloud level. Applications 704, such as workload management applications 710, only need be aware of common cloud service broker interface 726 to use cloud services 706 and 708. Applications 704 need not have details of public cloud interfaces 722 and 724 and other access details.

Cloud service broker 700 may support provisioning and management of cloud services 706 and 708 provided by a number of different cloud types. In accordance with an illustrative embodiment, cloud types supported by cloud service broker 700 may be defined by cloud type plug-ins 730 to cloud service broker 700. Individual cloud type plug-ins 730 may be provided for each different cloud type that is supported by cloud service broker 700. Cloud type plug-ins 730 may define the particular parameters and protocols needed by cloud service broker 700 to provision and manage cloud services 706 and 708 on various different types of clouds. Cloud type plug-ins 730 may come provided with product 732. Cloud type plug-ins 730 that come provided with product 732 are provided along with cloud service broker 700 when cloud service broker 700 is first obtained and installed in hybrid cloud integrator 702. Alternatively, or additionally, cloud type plug-ins 730 may be downloaded 734 and implemented, configured, and activated in cloud service broker 700 at a later time.

Cloud service broker 700 may be used for provisioning and management of cloud services 706 and 708 on specific instances of a cloud type. For example, cloud service broker 700 may be used to provision and manage cloud services 706 and 708 on multiple clouds of a given type or of more than one type. Cloud service broker 700 may maintain cloud definitions 736 for each such cloud instance. Cloud definitions 736 define the details of cloud instances of various cloud types supported by cloud service broker 700. Each such cloud instance will be defined by unique attributes that are specified in cloud definitions 736. Cloud instances may be identified in cloud definitions 736 by an identifying cloud name or handle and the associated cloud instance attributes. The cloud name is used as an external key that is used by the system to identify automatically which cloud to address. Cloud attributes may include, for example and without limitation, cloud type, endpoint address, and location data. The cloud type may be identified based on supported application programming interfaces. For example, IBM Compute Cloud and Amazon EC2 Cloud are examples of cloud types. The cloud end-point address may be, for example, a universal resource locator. The cloud location includes cloud type specific location data. These details may be saved by cloud service broker 700 as cloud definitions 736. Applications 704, or other users of cloud service broker 700, may use the name associated with one of cloud service broker cloud definitions 736 to direct workload to cloud services 706 and 708 on the corresponding cloud instance.

Examples of cloud service broker cloud definitions 736 include the following:

CloudName: IBMCCSBY; CloudType: IBMCC; CloudEndPoint: https://www-180.ibm.com/cloud/enterprise/beta; CloudLocation: 2.

CloudName: IBMCCRAL; CloudType: IBMCC; CloudEndPoint: https://www-147.ibm.com/cloud/enterprise; CloudLocation: 1.

CloudName: EC2USEAST; CloudType: AMZEC2; CloudLocation: us-east-1a.

In accordance with an illustrative embodiment, cloud service broker 700 may be used to provision cloud services 706 and 708 for any number of defined cloud types and instances of those cloud types. Cloud service broker 700 also may provide an extensible set of service handlers 738. For example, cloud service broker 700, in accordance with an illustrative embodiment, may provide a framework for handling custom service call parameters, exception handling, and result handling. An abstract class may be used to provide a common framework for all cloud type service implementations. A list of common services in the framework may be extended without the prerequisite of having all cloud type plug-ins 730 updated first. Cloud service broker 700 may default to an exception for any not yet implemented cloud type plug-ins. For example, cloud service broker 700 may default to UnsupportedCloudServiceException for any not yet implemented cloud type plug-ins.

Examples of service handlers 738 that may be supported by cloud service broker 700 may include, without limitation, one or more of the following:

listAddresses
listAddress addressed
listImages
listImage imageID
listInstances
listInstances instance ID
makeAddress
makeImage instanceID imageName <imageDescription>
makeInstance imageID instanceName instanceType <addressID>
restartInstance imageID
deleteAddress addressID
deleteImage imageID
deleteInstance instanceID
registerCloudDefinition CloudName CloudType <CloudEndPoint> <CloudLocation>
unregisterCloudDefinition CloudName In accordance with an illustrative embodiment, cloud service broker 700 may provide an administrative control point for enforcement of policies 740. Policies 740 may be defined by consumer of data processing resources 712 or another entity to define limits or conditions for provisioning services by cloud service broker 700. For example, policies 740 may define or limit the cloud types or cloud instances that may be provisioned by cloud service broker 700 or the conditions under which cloud services may be provisioned by cloud service broker 700.

Referring now to FIG. 8, a flowchart of a high-level process workflow for establishing hybrid cloud services using a hybrid cloud integrator is depicted in accordance with an illustrative embodiment. For example, the workflow of FIG. 8 may be implemented using hybrid cloud integrator 430 of FIG. 4. As discussed above, a hybrid cloud integrator, in accordance with an illustrative embodiment, provides a framework for deploying hybrid cloud services in a structured manner using defined application programming interfaces and other interfaces.

In accordance with an illustrative embodiment, the process begins by establishing hybrid cloud services that may begin with workload analysis (step 800). Step 800 may include analyzing the consumer's on-premise workload for resource, performance, and data requirements. A gap analysis may be performed to determine current and future business requirements and the gap between current and future workload demands and on-premise data processing capabilities. From the gap analysis, workloads suitable for implementation using hybrid cloud computing are identified. The hybrid cloud services needed for processing the identified workloads with a hybrid cloud are then identified.

Each hybrid cloud service identified in step 800 is defined (step 802). For example, step 802 may include defining business, information technology, and financial objectives for the service. Step 802 also may include defining the composition of the service and identifying principle guidelines for managing the service when in operation.

After a hybrid cloud service is defined, the service is implemented (step 804). In accordance with an illustrative embodiment, service implementation step 804 includes implementing the integration functionality required for the hybrid cloud service as a plug-in providing hybrid cloud interfaces. Step 804 includes installing the required plug-in in the hybrid cloud integrator.

After the plug-in for a hybrid cloud service is installed, the hybrid cloud integrator user interface is used to configure and deploy the hybrid cloud service (step 806). During runtime, the hybrid cloud service is operated and managed (step 808) with the process terminating thereafter. In accordance with an illustrative embodiment, step 808 may include operating and managing the hybrid cloud service using the hybrid cloud integrator in accordance with the guidelines identified in service definition step 802.

In accordance with an illustrative embodiment, service implementation step 804, service configuration step 806, and runtime management step 808 all may be performed using a hybrid cloud integrator as disclosed herein. As discussed above, a hybrid cloud integrator in accordance with an illustrative embodiment provides a framework for performing these functions in a structured manner using defined application programming interfaces and user interfaces.

Referring now to FIG. 9, a flowchart of a process for configuring a hybrid cloud service plug-in using a hybrid cloud service plug-in interface is depicted in accordance with an illustrative embodiment. The hybrid cloud service plug-in is registered using the hybrid cloud integrator plug-in interface (step 900). Static and dynamic attributes of the hybrid cloud service plug-in to be deployed are defined (step 902). For each attribute of the hybrid cloud service plug-in, configuration parameters, type, source, and default values are defined or selected (step 904). On-premise and off-premise connections for the hybrid cloud service plug-in are defined (step 906). Attribute, type, and default values are defined for each connection (step 908). Hybrid cloud service plug-in life cycle management methods are defined (step 910). Hybrid cloud service plug-in log locations and log configuration parameters may be defined (step 912). Policy control points for the hybrid cloud service plug-in may be defined (step 914).

Figure 10:
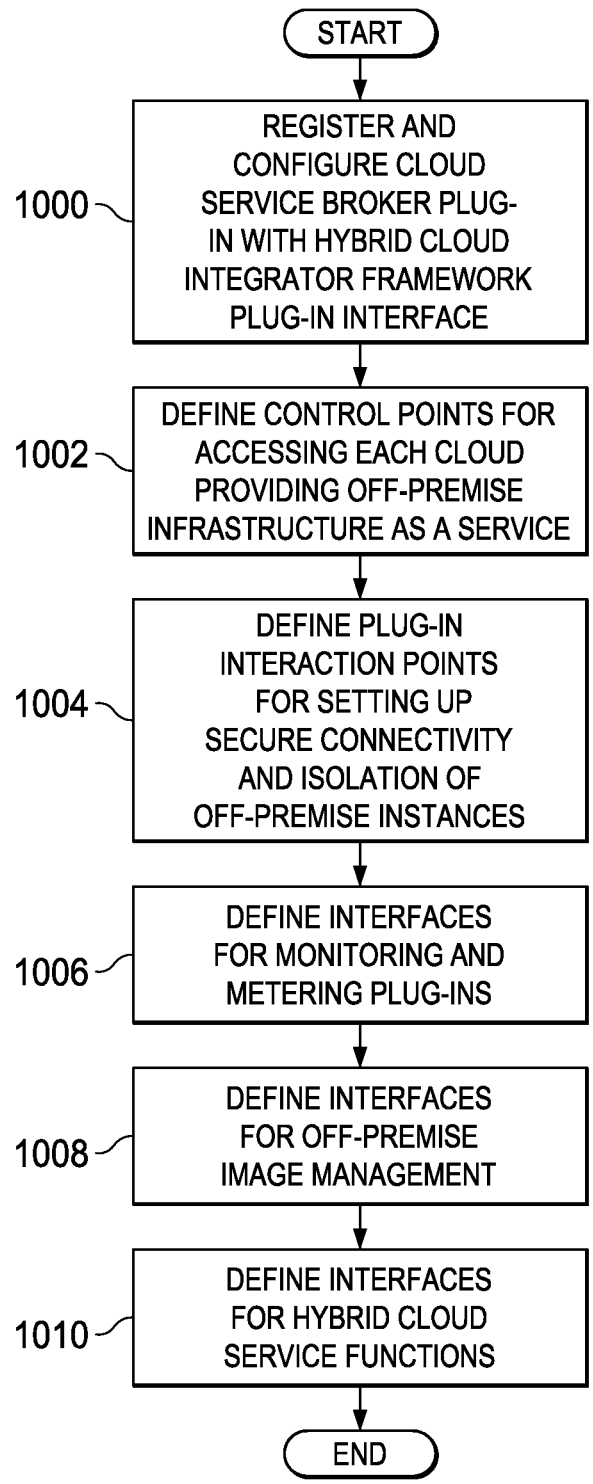
FIG. 10 is a flowchart of a process for deploying an infrastructure as a service cloud service broker plug-in in accordance with an illustrative embodiment.

Referring now to FIG. 10, a flowchart of a process for deploying an infrastructure as a service cloud service broker plug-in is depicted in accordance with an illustrative embodiment. The cloud service broker plug-in is registered and configured with the hybrid cloud integrator framework plug-in interface (step 1000). Control points for accessing each cloud providing off-premise infrastructure as a service are defined (step 1002). Plug-in interaction points for setting up secure connectivity and isolation of off-premise instances are defined (step 1004). Interfaces for monitoring and metering plug-ins are defined (step 1006). Interfaces for off-premise image management are defined (step 1008). Interfaces for hybrid cloud service functions are defined (step 1010) with the process terminating thereafter.

Hybrid cloud integration in accordance with an illustrative embodiment provides a well defined method and apparatus for integrating on-premise infrastructure, platform, applications, and data with off-premise cloud based infrastructure, platform, services, and data. A hybrid cloud integrator in accordance with an illustrative embodiment provides a structured framework of interfaces for hybrid cloud service configuration and deployment of service plug-ins. Using these interfaces and application programming interfaces, hybrid cloud service plug-ins may be defined, configured, and deployed to create integrated hybrid cloud services.

Hybrid cloud integration in accordance with an illustrative embodiment may be used to provide integration capabilities across a hybrid cloud comprising any combination of data processing resources. In one example, described in detail herein, a hybrid cloud integrator in accordance with an illustrative embodiment may be used to provide integration across a hybrid cloud comprising a consumer's private cloud and a provider's pubic cloud. However, hybrid cloud integration in accordance with an illustrative embodiment may be used to provide integration capabilities for various other types of hybrid clouds. For example, a hybrid cloud integrator in accordance with an illustrative embodiment may be used to provide integration across a hybrid cloud comprising multiple private clouds. As another example, a hybrid cloud integrator in accordance with an illustrative embodiment may be used to provide integration across a hybrid cloud comprising multiple public clouds.

Each line of business within a single enterprise may have its own data processing resources implemented as a private cloud. Each such private cloud may have its own point-of-delivery and point-of-control. Multiple private clouds of this type may be integrated into a single hybrid cloud and made available to a consumer of data processing resources within the enterprise. A hybrid cloud integrator in accordance with an illustrative embodiment may be used to provide integration across such a hybrid cloud. A hybrid cloud formed by integrating private cloud services across multiple private clouds using a hybrid cloud integrator in accordance with an illustrative embodiment allows a consumer of resources of one private cloud to consume, from the consumer's point-of-delivery, resources and services made available on another private cloud. The hybrid cloud integrator may be configured to allow administrators of each private cloud to manage their clouds from their respective points-of-control. Hybrid cloud integrator plug-in services in accordance with an illustrative embodiment may be configured to allow the consumer of data processing resources to enforce the same security, monitoring, and governance requirements on the consumer's data processing operations performed across the hybrid cloud, wherever the consumer's workload is being processed. Thus, using a hybrid cloud integrator in accordance with an illustrative embodiment, workload management may be achieved in a hybrid cloud formed across multiple private clouds.

As another example, hybrid cloud integration in accordance with an illustrative embodiment may be used to integrate across a hybrid cloud between two or more public clouds. In this case, use of a hybrid cloud integrator in accordance with an illustrative embodiment allows a consumer of data processing resources of one public cloud to perform and control consumer data processing operations by coordinating and consuming resources and services from multiple public clouds using a single point-of-delivery and point-of-control. Plug-in components in the hybrid cloud integrator may be configured to allow the consumer to enforce the same security, monitoring, and governance requirements on the consumer's data processing operations performed across the hybrid cloud, wherever the consumer's workload is being processed. Thus, using a hybrid cloud integrator in accordance with an illustrative embodiment, workload management may be achieved in a hybrid cloud formed across multiple public clouds.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer program product stored on a computer readable storage device having program instructions embodied thereon that are executable by a processor unit for integrating data processing resources, the computer program product comprising:
   program instructions to establish a connection through a firewall between a provider side monitoring gateway associated with provider data processing resources located in a hybrid cloud and a consumer side monitoring gateway associated with consumer data processing resources located in the hybrid cloud using a monitoring plug-in of a hybrid cloud integrator;
   program instructions to pull provider side monitored data collected by the provider side monitoring gateway into the consumer side monitoring gateway using the connection through the firewall;
   program instructions to push the provider side monitored data pulled into the consumer side monitoring gateway and consumer side monitored data collected by the consumer side monitoring gateway to a consumer side monitoring infrastructure;
   program instructions to detect an occurrence of an event that defines a pattern over a specified time period in at least one of the provider side monitored data and the consumer side monitored data using the consumer side monitoring infrastructure;
   program instructions to send the event as input to an event correlation and aggregation function that aggregates and correlates received events over periods of time;
   program instructions to determine that a series of received events has occurred indicating at least one of the consumer data processing resources and the provider data processing resources is in an overload or underutilization condition using the event correlation and aggregation function;
   program instructions, responsive to determining that the series of received events has occurred, to generate an event based service request to modify a resource configuration of the hybrid cloud using a service desk ticketing function; and
   program instructions to send the event based service request to a workload manager that accesses at least one of the consumer data processing resources and the provider data processing resources to modify the resource configuration of the hybrid cloud to respond to the overload or underutilization condition.

2. The computer program product of claim 1, wherein a consumer of data processing resources comprises a workload management system selected from a group of workload management systems consisting of an automated workload management system, a manually operated workload management system, and an automated workload management system operating in combination with a human operator.

3. The computer program product of claim 1, further comprising:
   program instructions to communicate with a plurality of the provider data processing resources via data processing resource interfaces, wherein each of the plurality of the provider data processing resources has a different application programming interface for the data processing resource interfaces.

4. The computer program product of claim 1, further comprising:
   program instructions to define requirements for using the provider data processing resources of a number of different cloud types via data processing resource interfaces of the number of different cloud types.

5. The computer program product of claim 1, further comprising:
   program instructions to acquire the provider data processing resources for use by a consumer of data processing resources;
   program instructions to release the provider data processing resources that are no longer needed for use by the consumer of data processing resources;
   program instructions to change a quality of the provider data processing resources for use by the consumer of data processing resources;
   program instructions to change a quantity of the provider data processing resources for use by the consumer of data processing resources; and
   program instructions to integrate management services for managing the use of the provider data processing resources by the consumer of data processing resources with management services for managing the consumer data processing resources for use by the consumer of data processing resources.

6. The computer program product of claim 1, wherein the provider data processing resources are selected from a group of data processing resources provided as a service consisting of infrastructure as a service, software as a service, platform as a service, and storage as a service.

7. The computer program product of claim 1, wherein the provider data processing resources are provided as a service on the hybrid cloud.

8. The computer program product of claim 7, wherein:
   a consumer of data processing resources comprises the consumer data processing resources;
   a software framework is installed on the consumer data processing resources; and
   the hybrid cloud comprises the consumer data processing resources.

9. The computer program product of claim 8, wherein the hybrid cloud is selected from a group of hybrid clouds consisting of:
   a first hybrid cloud wherein the provider data processing resources are provided as a service on a public cloud and the consumer data processing resources are provided on a private cloud;
   a second hybrid cloud wherein the provider data processing resources are provided as a service on a private cloud and the consumer data processing resources are provided on another private cloud; and
   a third hybrid cloud wherein the provider data processing resources are provided as a service on a public cloud and the consumer data processing resources are provided on another public cloud.

10. A method for integrating data processing resources, the method comprising:
    establishing, by a processor unit, a connection through a firewall between a provider side monitoring gateway associated with provider data processing resources located in a hybrid cloud and a consumer side monitoring gateway associated with consumer data processing resources located in the hybrid cloud using a monitoring plug-in of a hybrid cloud integrator;
    pulling, by the processor unit, provider side monitored data collected by the provider side monitoring gateway into the consumer side monitoring gateway using the connection through the firewall;

pushing, by the processor unit, the provider side monitored data pulled into the consumer side monitoring gateway and consumer side monitored data collected by the consumer side monitoring gateway to a consumer side monitoring infrastructure;

detecting, by the processor unit, an occurrence of an event that defines a pattern over a specified time period in at least one of the provider side monitored data and the consumer side monitored data using the consumer side monitoring infrastructure;

sending, by the processor unit, the event as input to an event correlation and aggregation function that aggregates and correlates received events over periods of time;

determining, by the processor unit, that a series of received events has occurred indicating at least one of the consumer data processing resources and the provider data processing resources is in an overload or underutilization condition using the event correlation and aggregation function;

responsive to the processor unit determining that the series of received events has occurred, generating, by the processor unit, an event based service request to modify a resource configuration of the hybrid cloud using a service desk ticketing function; and sending, by the processor unit, the event based service request to a workload manager that accesses at least one of the consumer data processing resources and the provider data processing resources to modify the resource configuration of the hybrid cloud to respond to the overload or underutilization condition.

11. The method of claim 10, further comprising:
activating, by the processor unit, a plug-in software component in a software framework to activate the establishing, pulling, pushing, detecting, sending, determining, and generating by the processor unit.

12. The method of claim 11, further comprising:
loading, by the processor unit, a number of plug-ins into the plug-in software component, wherein the number of plug-ins define requirements for acquiring the provider data processing resources of a number of different cloud types via data processing resource interfaces of the number of different cloud types.

13. The method of claim 10, wherein:
a request is received from a workload management system via an interface; and
wherein the workload management system is selected from a group of workload management systems consisting of an automated workload management system, a manually operated workload management system, and an automated workload management system operating in combination with a human operator.

14. The method of claim 10, further comprising:
communicating, by the processor unit, with a plurality of the provider data processing resources via data processing resource interfaces, wherein each of the plurality of the provider data processing resources has a different application programming interface for the data processing resource interfaces.

15. The method of claim 10, wherein the provider data processing resources are selected from a group of data processing resources provided as a service consisting of infrastructure as a service, software as a service, platform as a service, and storage as a service.

16. The method of claim 10, wherein the provider data processing resources are provided as a service on the hybrid cloud.

17. The method of claim 16, wherein:
a consumer of data processing resources comprises the consumer data processing resources; and
the hybrid cloud comprises the consumer data processing resources.

18. The method of claim 17, wherein the hybrid cloud is selected from a group of hybrid clouds consisting of:
a first hybrid cloud wherein the provider data processing resources are provided as a service on a public cloud and the consumer data processing resources are provided on a private cloud;
a second hybrid cloud wherein the provider data processing resources are provided as a service on a private cloud and the consumer data processing resources are provided on another private cloud; and
a third hybrid cloud wherein the provider data processing resources are provided as a service on a public cloud and the consumer data processing resources are provided on another public cloud.

19. A data processing system for integrating data processing resources, the data processing system comprising:
a bus system;
a storage device connected to the bus system, wherein the storage device stores program instructions; and
a processor unit connected to the bus system, wherein the processor unit executes the program instructions to:
establish a connection through a firewall between a provider side monitoring gateway associated with provider data processing resources located in a hybrid cloud and a consumer side monitoring gateway associated with consumer data processing resources located in the hybrid cloud using a monitoring plug-in of a hybrid cloud integrator;
pull provider side monitored data collected by the provider side monitoring gateway into the consumer side monitoring gateway using the connection through the firewall;
push the provider side monitored data pulled into the consumer side monitoring gateway and consumer side monitored data collected by the consumer side monitoring gateway to a consumer side monitoring infrastructure;
detect an occurrence of an event that defines a pattern over a specified time period in at least one of the provider side monitored data and the consumer side monitored data using the consumer side monitoring infrastructure;
send the event as input to an event correlation and aggregation function that aggregates and correlates received events over periods of time;
determine that a series of received events has occurred indicating at least one of the consumer data processing resources and the provider data processing resources is in an overload or underutilization condition using the event correlation and aggregation function;
generate an event based service request to modify a resource configuration of the hybrid cloud using a service desk ticketing function in response to determining that the series of received events has occurred; and
send the event based service request to a workload manager that accesses at least one of the consumer data processing resources and the provider data processing resources to modify the resource configuration of the hybrid cloud to respond to the overload or underutilization condition.

20. The data processing system of claim 19, wherein the processor unit loads a number of plug-ins into a plug-in software component, and wherein the number of plug-ins define requirements for acquiring the provider data processing resources of a number of different cloud types via data processing resource interfaces of the number of different cloud types.

21. The data processing system of claim 19, wherein the processor unit acquires the provider data processing resources via data processing resource interfaces of a plurality of the provider data processing resources, and wherein each of the plurality of the provider data processing resources has a different application programming interface for the data processing resource interfaces.

22. The data processing system of claim 19, wherein the provider data processing resources are selected from a group of data processing resources provided as a service consisting of infrastructure as a service, software as a service, platform as a service, and storage as a service.

23. The data processing system of claim 19, wherein the provider data processing resources are provided as a service on the hybrid cloud.

24. The data processing system of claim 23, wherein:
a consumer of data processing resources comprises the consumer data processing resources;
a software framework is installed on the consumer data processing resources; and
the hybrid cloud comprises the consumer data processing resources.

25. The data processing system of claim 24 wherein the hybrid cloud is selected from a group of hybrid clouds consisting of:
a first hybrid cloud wherein the provider data processing resources are provided as a service on a public cloud and the consumer data processing resources are provided on a private cloud;
a second hybrid cloud wherein the provider data processing resources are provided as a service on a private cloud and the consumer data processing resources are provided on another private cloud; and
a third hybrid cloud wherein the provider data processing resources are provided as a service on a public cloud and the consumer data processing resources are provided on another public cloud.

* * * * *